(12) United States Patent
Guo et al.

(10) Patent No.: US 11,232,154 B2
(45) Date of Patent: Jan. 25, 2022

(54) NEURAL RELATED SEARCH QUERY GENERATION

(71) Applicant: Microsoft Technology Licensing, LLC, Redmond, WA (US)

(72) Inventors: Weiwei Guo, Foster City, CA (US); Lin Guo, Saratoga, CA (US); Jianling Zhong, San Jose, CA (US); Huiji Gao, San Jose, CA (US); Bo Long, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 293 days.

(21) Appl. No.: 16/367,849

(22) Filed: Mar. 28, 2019

(65) Prior Publication Data

US 2020/0311146 A1   Oct. 1, 2020

(51) Int. Cl.
*G06F 16/9032* (2019.01)
*G06N 5/04* (2006.01)
*G06F 16/904* (2019.01)
*G06F 17/16* (2006.01)
*G06N 3/08* (2006.01)

(52) U.S. Cl.
CPC ...... *G06F 16/90332* (2019.01); *G06F 16/904* (2019.01); *G06F 17/16* (2013.01); *G06N 3/08* (2013.01); *G06N 5/04* (2013.01)

(58) Field of Classification Search
CPC .. G06F 16/90332; G06F 16/904; G06F 17/16; G06N 3/08; G06N 5/04
See application file for complete search history.

(56) References Cited

U.S. PATENT DOCUMENTS

| | | | |
|---|---|---|---|
| 2008/0319962 A1* | 12/2008 | Riezler | G06F 16/3338 |
| 2017/0255906 A1* | 9/2017 | Le | G06F 16/24573 |
| 2018/0052928 A1* | 2/2018 | Liu | G06F 16/2228 |
| 2019/0108228 A1* | 4/2019 | Zeng | G06N 3/0454 |

OTHER PUBLICATIONS

Bahdanau, et al., "Neural Machine Translation by Jointly Learning to Align and Translate", In Proceedings of 3rd International Conference on Learning Representations, May 7, 2015, 15 Pages.
(Continued)

*Primary Examiner* — Ashish Thomas
*Assistant Examiner* — Dustin D Eyers
(74) *Attorney, Agent, or Firm* — NDWE, LLP.

(57) ABSTRACT

A neural related query generation approach in a search system uses a neural encoder that reads through a source query to build a query intent vector. The approach then processes the query intent vector through a neural decoder to emit a related query. By doing so, the approach gathers information from the entire source query before generating the related query. As a result, the neural encoder-decoder approach captures long-range dependencies in the source query such as, for example, structural ordering of query keywords. The approach can be used to generate related queries for long-tail source queries, including long-tail source queries never before or not recently submitted to the search system.

20 Claims, 13 Drawing Sheets

(56) References Cited

OTHER PUBLICATIONS

Cho, et al., "Learning Phrase Representations using RNN Encoder-Decoder for Statistical Machine Translation", Retrieved from https://arxiv.org/pdf/1406.1078.pdf, Sep. 3, 2014, 15 Pages.

He, et al., "Learning to Rewrite Queries", In Proceedings of the 25th ACM International on Conference on Information and Knowledge Management, Oct. 24, 2016, 10 Pages.

Hochreiter, et al., "Long Short Term Memory", In Journal Neural Computation vol. 9 Issue 8, Nov. 15, 1997, 32 Pages.

Rumelhart, et al., "Learning Representations by Back-Propagating Errors", In Journal of Nature, vol. 323, Oct. 9, 1986, 4 Pages.

Sutskever, et al., "Sequence to Sequence Learning with Neural Networks", In Proceedings of Advances in Neural Information Processing Systems, Dec. 14, 2014, 9 Pages.

Werbos, Paul J.., "Backpropagation Through Time: What It Does and How to Do It", In Proceedings of the IEEE, vol. 78 Issue 10, Oct. 1, 1990, 11 Pages.

\* cited by examiner

NEURAL RELATED SEARCH QUERY GENERATION

TECHNICAL FIELD

The present disclosure relates generally to computer-implemented techniques for generating search queries that are related to given search queries. More particularly, the present disclosure relates to computer-implemented techniques for neural related search query generation.

BACKGROUND

Computers are very powerful tools for performing a variety of information processing tasks. One information processing task computers are very useful for is searching for relevant information among a corpus of information. Inverted indexes are one common mechanism for efficiently identifying information of interest among a corpus using a computer. A typical inverted index is a mapping of keywords to the documents in the corpus that contain or are associated with the keywords.

As just one example, an inverted index of the world's publicly accessible web pages may map words in the web pages to the subset of the web pages that contain that word. An inverted index may index other types of information items such as, for example, job postings, online courses, social media posts, wiki articles, or other offline or online information items.

Between the actual physical inverted index itself (e.g., the index data as stored on one or more computers) and the users of the system, a search system or "engine" is typically provided as a software cushion or layer. In essence, the search system shields the user from knowing or even caring about underlying search system details. For example, documents relevant to a user's request for information may be identified by the search system using the inverted index, all without user knowledge of the underlying search system implementation. In this manner, the search system provides users access to relevant information without concern to how the information is indexed or accessed.

One function of the search system is to answer search queries (or just "queries" for short). A query may be defined as a logical expression including a set of one or more search keywords, and results in the identification of a subset of indexed documents. Consider, for instance, the handling of a request for information from the search engine for discovering employment opportunities. In operation, this request is typically issued by a client system as one or more secure Hyper Text Transfer Protocol or "HTTP/S" requests for retrieving particular search results (e.g., a list of job posting containing the words "software" and "developer") from indexes on server computers. In response to this request, the search system typically returns a web page containing hyperlinks to those job postings considered to be most relevant to the search terms "software" and "developer".

Sometimes the search results presented on the web page returned by the search engine in response to a search request do not meet the querying user's information need. The user may not realize this until after the user has scrolled through the search results starting from the top of the web page, where the most relevant search results are presented, to the bottom of the web page, where the less relevant search results are presented. If the user reaches the bottom of the search results without having found a result of interest, the user may then reformulate the search query and submit a new search request to obtain new search results from the search system that are, hopefully, more relevant to the user's information need.

The search system may offer a set of one or more related search queries in the search results web page, typically at the bottom of the web page where the user can find them after having scrolled through current search results and not found one of interest. The offered search queries are related to the current search query for which the current search results are provided. For example, at the bottom of the web page presenting search results for the current search query "software developer" may be a hyperlink to submit the related search query "software engineer" to the search system. Thus, instead of the user being burdened with the task of formulating a related search query by, the user can discover and accept a related search query that is offered by the search system.

The search system may use a simple frequency counting approach to determine related search queries. For example, query logs that record search queries submitted to the search system can be analyzed for query reformulation occurrences. According to the frequency counting approach, a query X may be related to query Y if more than a threshold frequency of query reformulation occurrences of original query Y as query X is found in the query logs. For example, a user may submit the search query "software developer," and then less than a minute later, the same user may submit the search query "software engineer." This might be counted as one query reformulation occurrence of the query "software developer" as the query "software engineer." If, according to the query logs, more than a threshold number of such user reformulation occurrences by the same or different users happened within a time period, then the query "software engineer" might be considered related to the query "software developer." After that, if a user submits the query "software developer," the user may be presented with the query "software engineer" as a related search option on the search results web page for the query "software developer."

A problem with the frequency counting approach for determining related queries is handling long-tail queries. Of all the distinct search queries that the search system receives during a time period there are typically a smaller number of them (e.g., 20% of all distinct queries) that are each submitted to the search system many times by users and a larger number of them (e.g., 80% of all distinct queries) that are submitted to the search system substantially fewer times each by users. A long tail query is so named because it is one of the larger numbers of distinct queries in the long tail end of a graph where the x-axis represents the set of distinct queries submitted to the search system in decreasing order of the number of submissions and the y-axis represents the number of submissions. Typically, such a graph drops off steeply, then heads rightward with a relatively flat long tail. The tail represents the distinct queries that individually are unpopular but that collectively represent a significant portion (e.g., 50%) of query submissions to the search system.

Due to the nature of long-tail queries, there may not be enough query reformulation occurrences in the query logs from which to determine related queries thereto using the frequency counting approach. As a result, the search system using the frequency counting approach may not be able to provide related search queries for some or all long-tail queries, including new queries never before submitted, or not recently submitted, to the search system. Further, since the frequency counting approach considers search queries with all query terms collectively, it may not be able to determine related queries for a search query that is only a slight variation of another search query for which it is able to determine related queries. For example, the query logs may have enough query reformulation occurrences involving the original query "software developer" but not have enough for the query "software developer person" or other slight variation. In this case, the frequency counting approach may not be able to determine a related search query for the query "software developer person" even though it can determine a related search query for the query "software developer."

The present invention addresses these and other issues.

The approaches described in this section are approaches that could be pursued, but not necessarily approaches that have been previously conceived or pursued. Therefore, unless otherwise indicated, it should not be assumed that any of the approaches described in this section qualify as prior art, or are well-understood, routine, or conventional, merely by virtue of their inclusion in this section.

DETAILED DESCRIPTION

Figure 1:
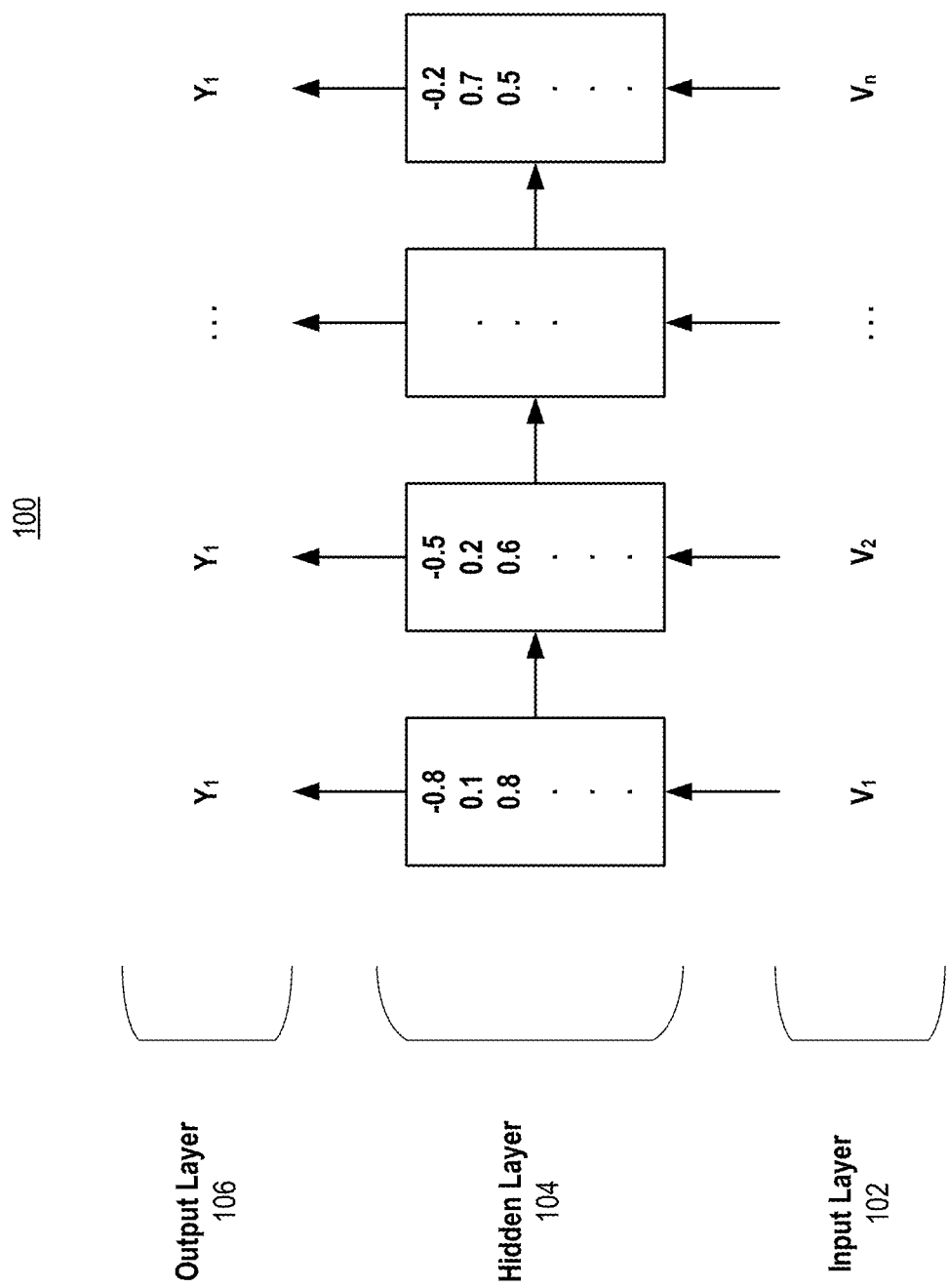
FIG. 1 depicts a recurrent neural network for neural related query generation in an unrolled time view, according to some embodiments of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

An artificial neural approach for use with a search system for generating related search queries for source search queries, including long-tail source search queries, is provided. The approach can leverage search system query logs to automatically produce supervised machine learning training data of user original and reformulated query pairs, without requiring humans to manually generate training examples.

Further, the search system, using the neural approach, can generate a set of N-number of related queries for a given source query, in the context of the search engine processing the given source query, including formulating search results to the given source query, without adding to the overall query processing latency of the search system.

This latency-free overhead is accomplished by generating the set of related queries in parallel with formulation of the search results and then combining the search results with the set of related queries in a web page, or the like, that is returned by the search system to the querying user's computing device for display to the user there. Even though the neural approach is used, the set of related queries can be generated within the time it takes the search system to formulate the search results. And because the neural approach is used, a set of related queries can be generated for a given source query, including a long-tail source query. Thus, in contrast to the frequency counting approach discussed above in the Background section, the neural approach provides the benefit of being able to generate related queries for long-tail source queries and without adding to the overall query processing latency of the search system.

At a high-level, the related query generation approach uses an artificial neural encoder that reads through a source query to build one or more "query intent" vectors. A query intent vector is a sequence of numbers that represents a complete or partial understanding of the source query. The approach then processes the query intent vector(s) through a neural decoder to emit a related query. By doing so, the approach gathers information from the entire source query before generating the related query. As a result, the neural encoder-decoder approach captures long-range dependencies in the source query such as, for example, structural ordering of query keywords. Foundations of the neural encoder-decoder approach are described in the paper by I. Sutskever, O. Vinyals, and Q. V. Le; entitled "Sequence to sequence learning with neural networks"; In Advances in neural information processing systems, pages 3104-3112, 2014, the entire contents of which is hereby incorporated by reference.

Recurrent Neural Network

According to some embodiments of the present invention, the neural approach to related query generation is based on a recurrent artificial neural network. A recurrent neural network is a useful architecture for processing sequential data such as a sequence of keywords of a query. A recurrent neural network, or just RNN, is a type of artificial neural network with at least one feed-back connection such that activations can flow round in a loop thereby enabling the RNN to perform temporal processing and learn sequences. Some of the foundational bases for modern computer RNNs were first described in the following papers: (1) D. Rumelhart, G. E. Hinton, and R. J. Williams. Learning representations by back-propagating errors. Nature, 323(6088):533-536, 1986; and (2) P. Werbos. Backpropagation through time: what it does and how to do it. Proceedings of IEEE, 1990, the entire contents of which is hereby incorporated by reference.

Generally, an RNN accepts, as input, a sequence of vectors and processes them one at a time in steps sometimes referred to as "timesteps." At each timestep, memory of the RNN is updated to produce a hidden state for the timestep. The RNN may be configured with a non-linear function (e.g., based on sigmoid or tan h) that computes, at each timestep, a new hidden state given a current input vector and a previous hidden state. Also, at each timestep, the RNN can optionally output a probability distribution over a set of output classes (e.g., words in a query vocabulary) according to a soft max function. In contrast to a feedforward artificial neural network, for example, an RNN is useful for capturing the dynamics of arbitrarily long queries without having to increase modeling capacity.

FIG. 1 depicts example RNN 100 for neural related query generation in an unrolled time view, according to some embodiments of the present invention. RNN 100 includes input layer 102, hidden layer 104, and output layer 106. RNN 100 process input sequence of vectors $V_1, V_2, \ldots, V_N$ to build up hidden representations as each input vector is consumed. RNN 100 produces output sequence $Y_1, Y_2, \ldots, Y_N$. Weights of the RNN such as recurrent and feed-forward weights may be learned and may be shared across timesteps.

Neural Encoder-Decoder Approach

Figure 2:
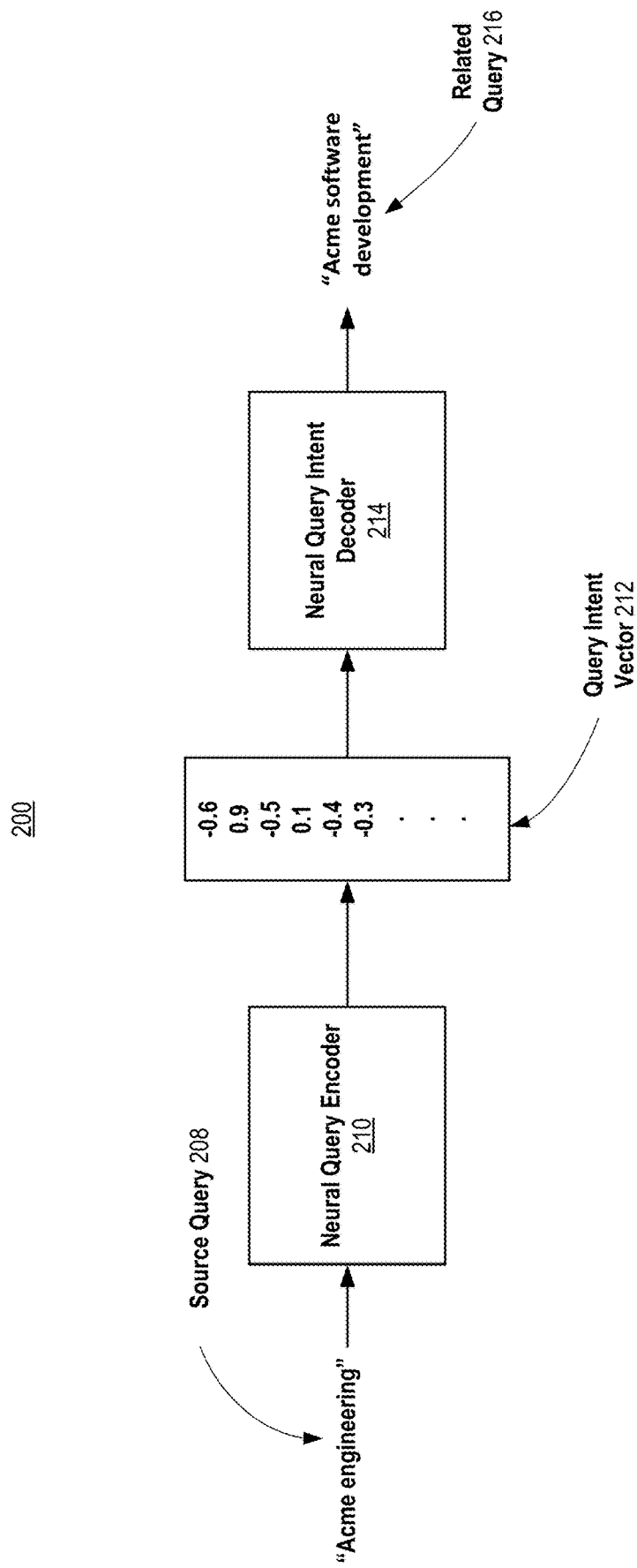
FIG. 2 depicts a neural encoder-decoder approach to neural related query generation, according to some embodiments of the present invention.

FIG. 2 depicts example neural encoder-decoder approach 200 for neural related query generation, according to some embodiments of the present invention. Neural query encoder 210 converts source query 208 into query intent vector 212 which is/are passed through neural query intent decoder 214 to generate related query 216. Query intent vector 212 may actually be composed of multiple vectors. For example, for a deep multi-layer neural query encoder 210 and 214, query intent vector 202 may include a vector for each layer.

Throughout this description, an example is used where the source query is "Acme engineering" and the related query generated based thereon is "Acme software development." This example is used for purposes of illustration only and is not intended to be limiting of the types of source and target queries for use in an implementation of the present invention. More generally, the source query and related query can each be a sequence of one or more query keywords where the keywords and the number of keywords may differ between them.

A neural model for sequential data may be used for both the neural query encoder and the neural query intent decoder. In some implementations, an RNN with a long short-term memory (LSTM) as the recurrent unit is used for both the neural query encoder and the neural query intent decoder. With LSTM RNNs, the hidden state may also include an internal cell state. Thus, reference here to "hidden state" or "hidden states" in the context of an RNN encompasses any cell state or cell states of the RNN such as those of a LSTM RNN. Using an LSTM RNN allows for the construction of a query intent vector for variable-length source search query inputs with different total numbers of characters and different numbers of keywords while handling long-range dependencies in the queries.

In some implementations, the neural query encoder and the neural query intent decoder each use a deep RNN with two LSTM layers to provide a sequence-based related query generator. The neural query encoder initially constructs a vector-based representation for a source query sequence. Then, the neural query intent decoder generates a related query sequence based on this vector-based representation, one symbol (e.g., keyword) at time until a predetermined end-of-sequence symbol is generated or until a threshold number of keywords are generated.

Deep Recurrent Architecture

Figure 3:
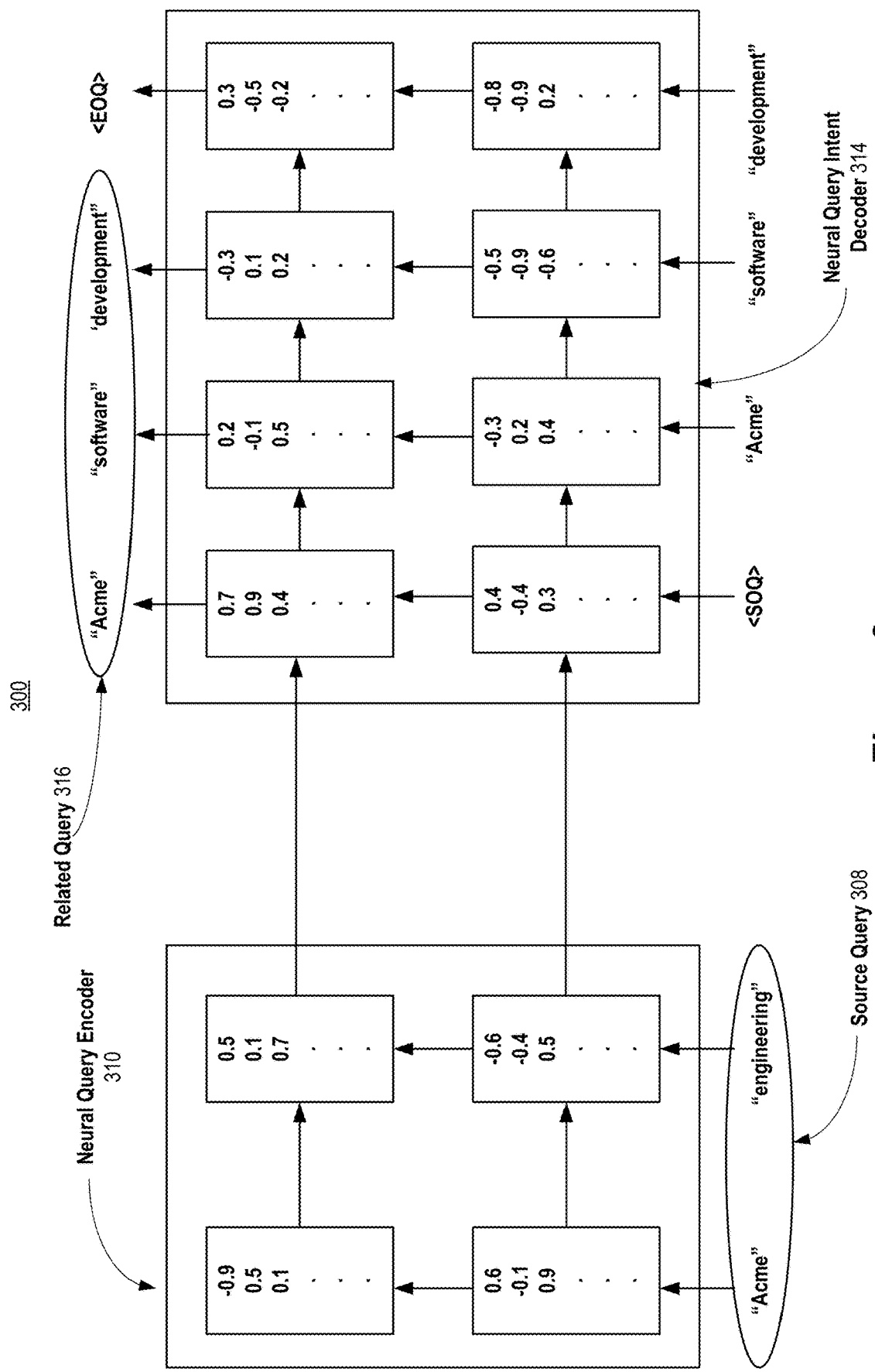
FIG. 3 depicts a deep recurrent architecture for neural related query generation in an unrolled time view, according to some embodiments of the present invention.

FIG. 3 depicts example deep recurrent architecture 300 for neural related query generation in an unrolled time view, according to some embodiments of the present invention. In this example, architecture 300 uses two LSTM stacking layers to provide a sequence-based related query generator.

Neural query encoder 310 generates a representation from source query sequence 308, one word at a time. Neural query intent decoder 314, then, generates related query sequence 316, one word at a time until a predetermined end-of-query <EOQ> symbol is generated.

In the example, architecture 300 generates related query sequence 316 "Acme software development" from the source query sequence 308 "Acme engineering". In generating related query sequence 316, the keyword output by neural query intent decoder 314 from the prior timestep is used as input to neural query intent decoder 314 for the next timestep.

At the first timestep of neural query intent decoder 314, the predetermined start-of-query <SOQ> symbol is input to neural query intent decoder 314 and the keyword "Acme" is output by neural query intent decoder 314 as the first keyword of the related query sequence 316.

At the next timestep, the most recent keyword output by neural query intent decoder 314 "Acme" is input to neural query intent decoder 314 and the keyword "software" is output by neural query intent decoder 314 as the next keyword of the related query sequence 316.

At the next timestep, the most recent keyword generated by neural query intent decoder 314 "software" is input to neural query intent decoder 314 and the keyword "development" is output by neural query intent decoder 316 as the next keyword of the related query sequence 316.

At the next timestep, the most recent keyword generated by neural query intent decoder 314 "development" is input to neural query intent decoder 314 and the predetermined end-of-query <EOQ> symbol is output by neural query intent decoder 314, thereby signaling the end of the related query sequence 316 generation by neural query intent decoder 314.

While in some embodiments, related query sequence generation stops for a given source query sequence only after the predefined end-of-query <EOQ> symbol is output by the neural query intent decoder, related query sequence generation stops for a given source query sequence after a threshold number of keywords are output by the neural query intent decoder even if the predefined end-of-query <EOQ> symbol has not yet been output by the neural query intent decoder.

Recurrent Query Model

According to some embodiments of the present invention, the neural query intent decoder assumes that the input and output sequences are query keyword sequences. In addition, the input keyword sequence to the neural query intent decoder may be prepended with a predefined start-of-query <SOQ> symbol. For example, the input keyword sequence x={"Acme", "software", "development"} may be prepended with the start-of-query symbol <SOQ> as x={<SOQ>, "Acme", "software", "development"}.

The recurrent query model may be configured to predict the next word in the related query sequence. As such, the output keyword sequence may be a shift-by-1 version of the input keyword sequence that ends with a predefined end-of-query <EOQ> symbol. The predefined end-of-query <EOQ> symbol in the output keyword sequence may mark the boundary of the related query.

According to some embodiments, to apply an RNN to queries, the keywords may be represented in a one-hot encoding with respect to a given vocabulary of query keywords. However, one-hot encoding can result in large matrices for computation and does not capture any notion of similarity between query keywords. Thus, instead of one-hot encoding, a low-dimensional dense representation of keywords, or embeddings, may be used. The embeddings may be predefined (e.g., word2vec or GloVe), or learned during training.

Figure 4:
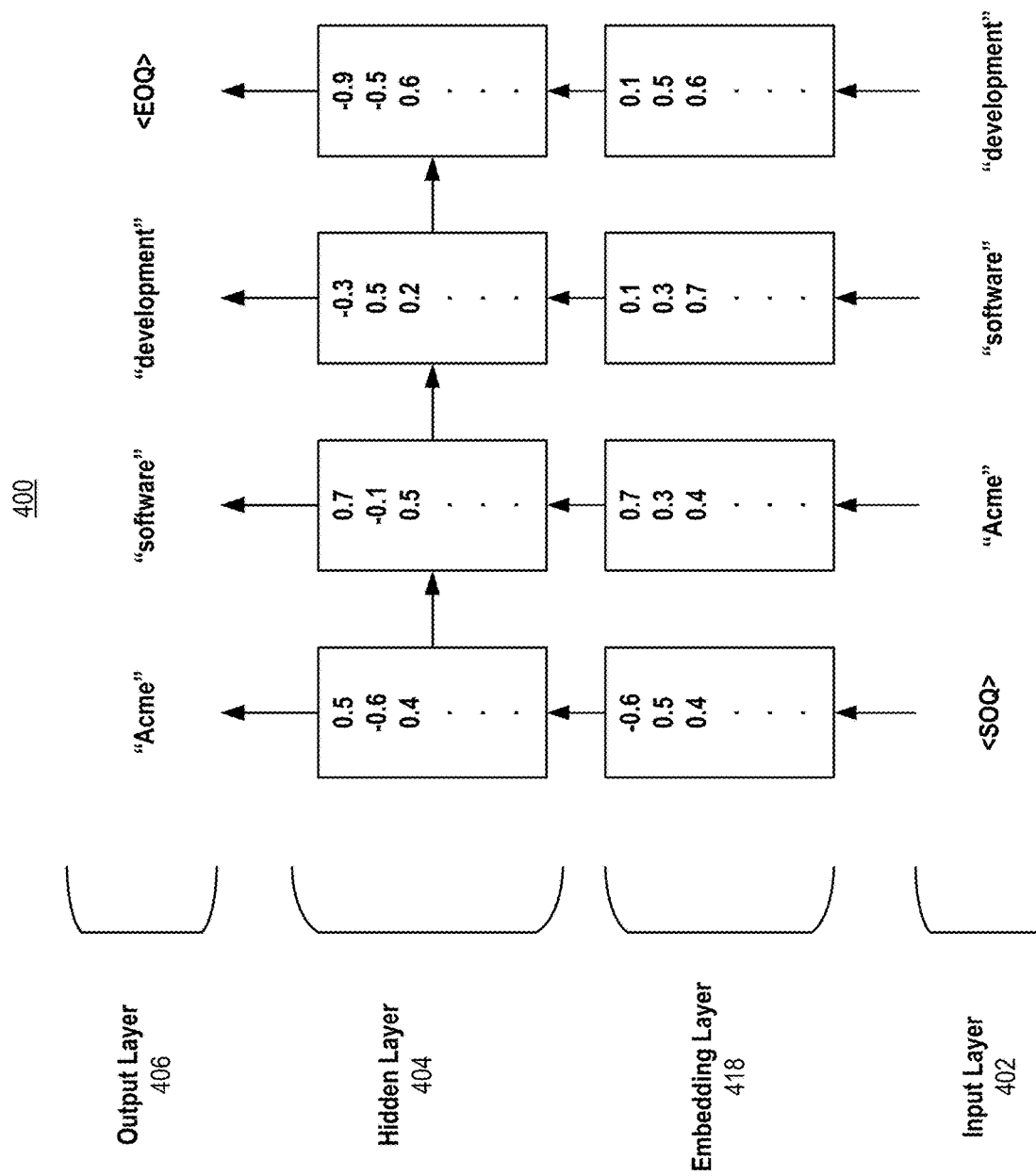
FIG. 4 depicts a recurrent neural network with an embedding layer for neural related query generation in an unrolled time view, according to some embodiments of the present invention.

FIG. 4 depicts example RNN 400 with embedding layer 418 for neural related query generation in an unrolled time view, according to some embodiments of the present invention. Network also includes input layer 402, hidden layer 404, and output layer 406. Network 400 processes an input query sequence "Acme software development" and predicts next keywords at each timestep. Like the recurrent and feed-forward weights of network 300, embedding weights may be shared across timesteps in network 400.

Neural Related Query Generation

According to some embodiments, a neural related query generator implements a recurrent query model that conditions on the source query. In particular, the neural related query generator directly models a conditional probability of generating a target query keyword sequence from a source query keyword sequence.

According to some embodiments, the neural related query generator achieves this through an encoder-decoder framework, as mentioned above. The encoder computes a query intent representation for each source query. Based on that query intent representation, the decoder generates a related query, one query keyword at a time.

According to some embodiments, the neural related query generator uses a unidirectional RNN architecture to simplify beam-search decoding by generating related query keywords from left to right as the queries would be read in the English language. However, the neural related query generator may generate related query keywords from right-to-left or from top-to-bottom depending on the directionality of the particular language at hand while still using a unidirectional RNN architecture.

According to some embodiments, the encoder and decoder of the neural related query generator are both deep multi-layer unidirectional RNNs that use a LSTM as the recurrent unit for better capturing of long-range dependencies in query keyword sequences. However, it is also possible to use a gated recurrent unit ("GRU") as the recurrent unit.

Figure 5:
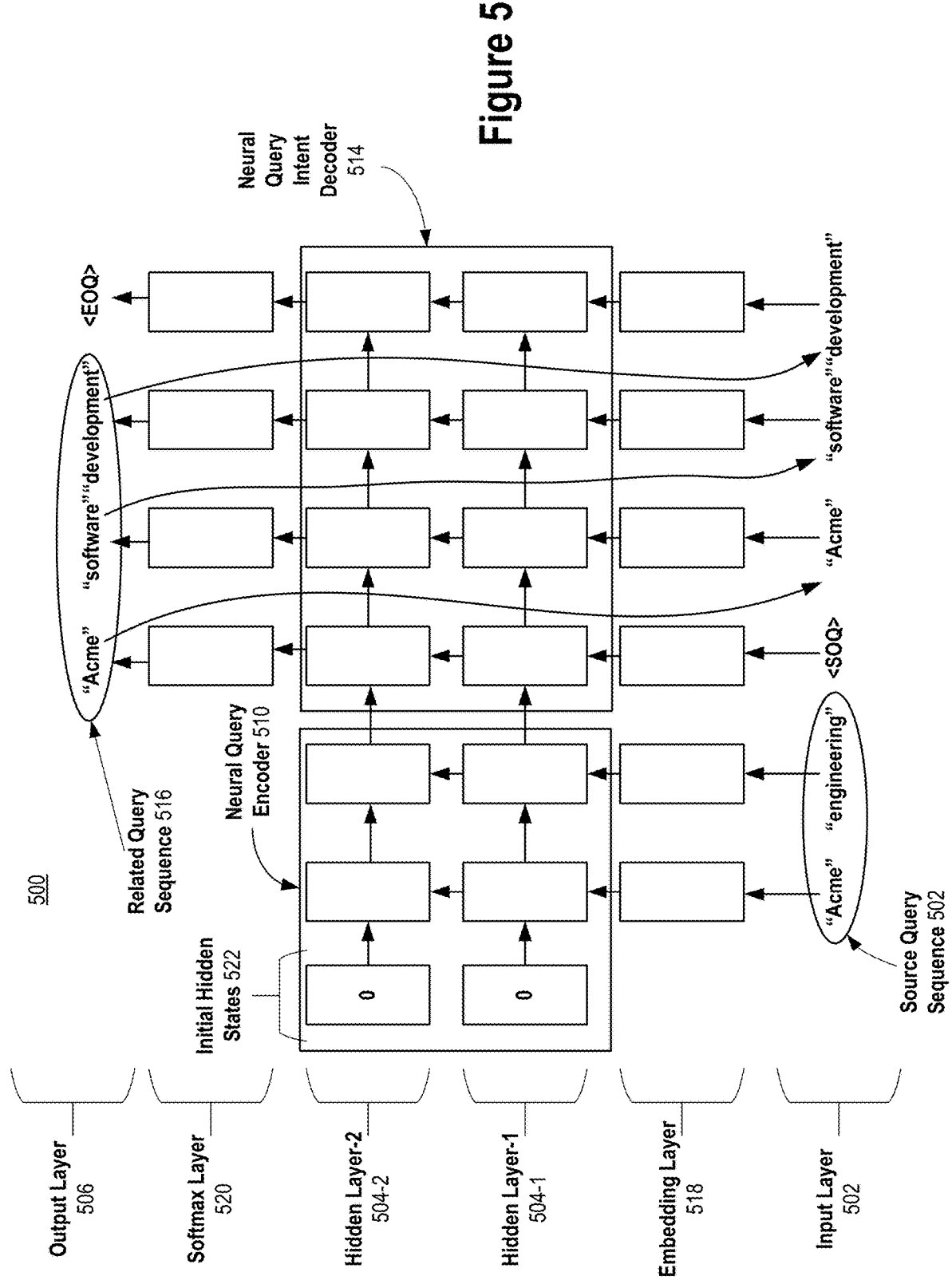
FIG. 5 depicts a deep recurrent architecture for neural related query generation in an unrolled time view, according to some embodiments of the present invention.

FIG. 5 depicts example deep recurrent architecture 500 for neural related query generation in an unrolled time view, according to some embodiments of the present invention. In this example, source query sequence 502 "Acme engineering" is input and related query sequence 510 "Acme software development" is generated. These are merely example source and related queries and, for instance, neural related query generation is not limited to these examples. Other related queries generated from other source queries may have different keywords including different numbers of keywords.

In more detail, at input layer 502, source query sequence 502 is input to neural query encoder 510, one keyword at a time. Thus, in this example, first "Acme" is input to neural query encoder 510, then followed by "engineering." Then, the start-of-query <SOQ> symbol is input to neural query intent decoder 514. When inputting keywords after the start-of-query <SOQ> to neural query intent decoder 514 after the start-of-query <SOQ> symbol is input to neural query intent decoder 514, the keyword to input is determined by the keyword output to related query sequence 516 from the previous timestep. For example, at a first timestep, inputting the start-of-sequence <SOQ> symbol to neural query intent decoder 514 generates the keyword "Acme" of related query sequence 516. At the next timestep, the keyword "Acme" is input to neural query intent decoder 514 which then generates keyword "software." At the next timestep after that timestep, the keyword "software" is input to neural query intent decoder 514, and so on. This is repeated until neural query intent decoder 514 outputs the end-of-query <EOQ> symbol.

In embedding layer 518, embeddings are looked up for each keyword input to neural query encoder 510 and neural query intent decoder 514. Note that if an embedding for a particular keyword has previously been looked up when input to the neural query encoder or the neural query intent decoder, then the embedding may be used for subsequent inputs of the particular keyword to the neural query encoder or the neural query intent decoder without needing to lookup the embedding again. For example, an embedding may be retrieved for "Acme" when input to neural query encoder 510 and that embedding may be used again when "Acme" is input to neural query intent decoder 514 without having to lookup the embedding for "Acme" again.

A query vocabulary of query keywords may be selected for use in embedding layer 518. For example, most frequent query keywords found in query logs may be selected for inclusion in the query vocabulary, possibly ignoring stop or other common words that the search system may ignore when processing queries. As another example, all unique keywords of all related queries included in the training set may be selected for inclusion in the query vocabulary, again possibly ignoring stop words or other common words.

Embedding weights may be learned during training given a training set of sufficient size. Alternatively, embedding weights can be initialized with pretrained word representations, such as word2vec or GloVe.

Once a word embedding is retrieved for an input query keyword, it is then input to hidden layer 504 which includes two multi-layer RNNs arranged together in series. One RNN—neural query encoder 510—is for representing source query sequence 502. The other RNN—neural query intent decoder 514—is for generating related query sequence 516 based on the final representation of source query sequence 502 generated by neural query encoder 510.

Neural query encoder 510 may be configured with zero vectors for the initial hidden states 522. Neural query intent decoder 514 uses information about source query sequence 502 as captured in the final hidden states of neural query encoder 510 after processing keywords of source input sequence 502 through neural query encoder 510. As such, the initial hidden states of neural query intent decoder 514 may be set based on the final hidden states of neural query encoder 510.

In the example of FIG. 5, the final hidden states of neural query encoder 510 after processing the keyword "engineering" of source input sequence 502 are transferred over to the initial hidden states of neural query intent decoder 514. Feed-forward weights may connect hidden layer-1 504-1 to hidden layer-2 504-2. Recurrent weights may transfer the learned knowledge from one timestep to the next. Different feed-forward and recurrent weights can be used across neural query encoder 510 and neural query intent decoder 514. Finally, the output of hidden layer-2 504-2 of neural query intent decoder 514 is transformed in soft max layer 520 to a probability distribution over the selected query vocabulary.

Neural Query Encoder

Figure 6:
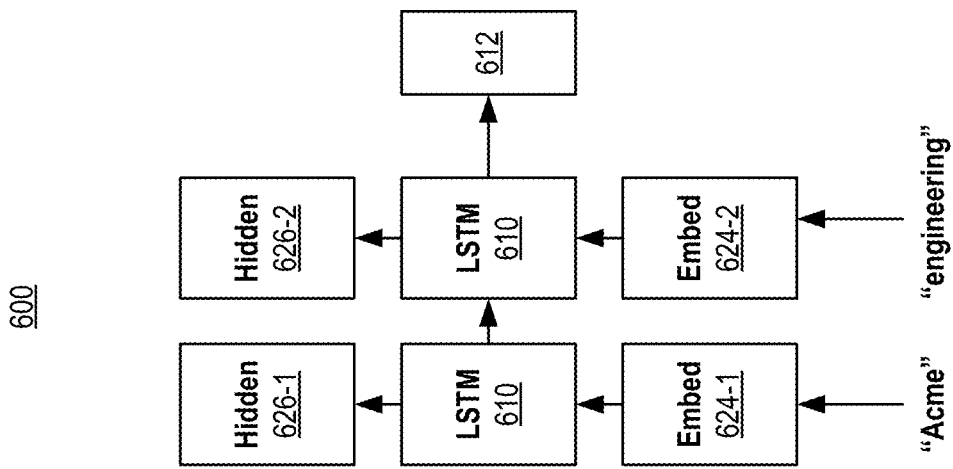
FIG. 6 depicts an example operation of a neural query encoder for neural related query generation in an unrolled time view, according to some embodiments of the present invention.

FIG. 6 depicts example operation 600 of neural query encoder 610 in an unrolled time view, according to some embodiments of the present invention. In this example, neural query encoder 610 is implemented as a deep LSTM RNN having two hidden layers. However, as few as one hidden layer or more than two hidden layers may be used, according to the requirements of the particular implementation at hand. The foundations for modern deep LSTM RNNs are described in the paper by S. Hochreiter and J. Schmidhuber; entitled "Long short-term memory"; Neural Computation, 1997, the entire contents of which is hereby incorporated by reference.

At a first timestep, the first keyword of the source query sequence "Acme" is converted to word vector 624-1 according to an embedding function. For example, word vector 624-1 can be learned during training of the corresponding neural query intent decoder and later retrieved from a lookup table that maps keywords in the query vocabulary to embeddings (i.e., word vectors representing word embeddings of the corresponding keywords). LSTM RNN encoder 610 in its initial hidden state (e.g., zero vectors) is run over word vector 624-1 resulting in hidden state 626-1 for LSTM RNN encoder 610.

At a second timestep after the first timestep, the next keyword of the source query sequence "engineering" is converted to word vector 624-2 according to an embedding function. For example, word vector 624-2 can be retrieved from the word embedding lookup table. LSTM RNN encoder 610, now in the hidden state 626-1 resulting after the first timestep, is run over word vector 624-2 resulting in final hidden state 626-2 for LSTM RNN encoder 610. Query intent vector 612 representing an understanding of the source query "Acme engineering" is then taken as final hidden state 626-2 for LSTM RNN encoder 610. That is, query intent vector 612 is hidden state 626-2 of neural query encoder 610.

Neural Query Intent Decoder

Figure 7:
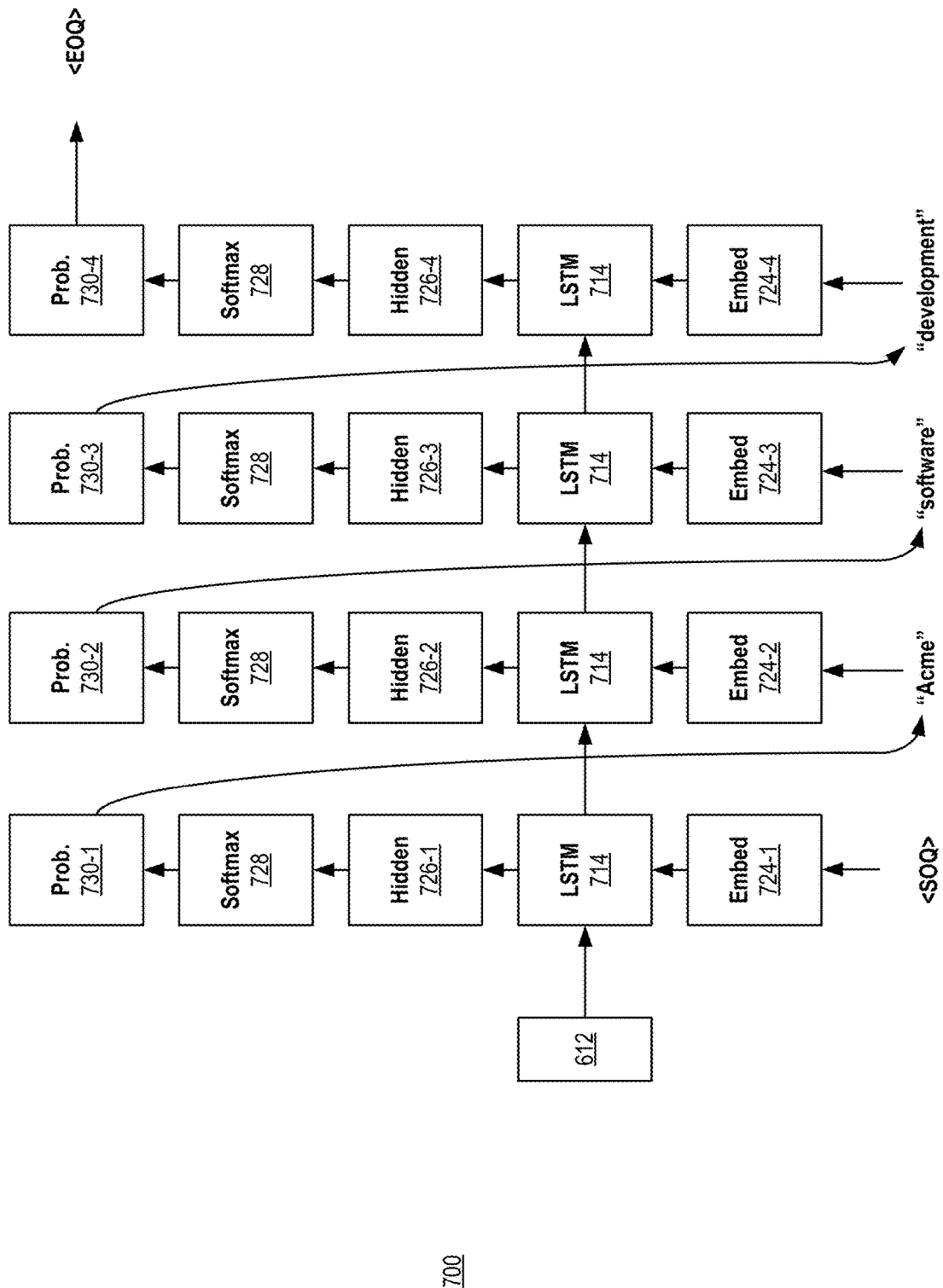
FIG. 7 depicts an example operation of a neural query intent decoder for neural related query generation in an unrolled time view, according to some embodiments of the present invention.

FIG. 7 depicts example operation 700 of neural query intent encoder 714 in an unrolled tine view, according to some embodiments of the present invention. The example of FIG. 7 continues the example of FIG. 6. In this example, neural query intent decoder 714 is implemented as a LSTM RNN having a same number of hidden layers as the neural query encoder 610 that generated query intent vector 612.

At or before the first timestep, the hidden state of LSTM RNN decoder 614 is set/initialized to query intent vector 612 generated by neural query encoder 610 for the source query "Acme engineering."

At or before the first timestep, the start-of-query <SOQ> symbol is converted to word vector 724-1 according to an embedding function. For example, word vector 730-1 can be retrieved from a lookup table.

At the first timestep, LSTM RNN decoder 714, with its initial hidden state of query intent vector 612, is run over word vector 724-1 resulting in hidden state 726-1 for LSTM RNN decoder 714. A projection function is applied to resulting hidden state 726-1 to produce a vector of a same size as the selected query vocabulary. Soft max function 728 is than applied to the projected vector to normalize the projected vector into vector of probabilities 730-1 over the query vocabulary. The query vocabulary keyword with the highest probability according to the vector of probabilities 730-1 is selected as the next keyword of the target query sequence. In this example, the next keyword selected at the first timestep is "Acme."

At or before a second timestep after the first timestep, the next keyword selected "Acme" from the previous first timestep is converted to word vector 724-2 according to an embedding function. For example, word vector 724-2 can be retrieved from a lookup table.

At the second timestep, LSTM RNN decoder 714, with its initial hidden state of hidden state 726-1 after the first timestep, is run over word vector 724-2 resulting in hidden state 726-2 for LSTM RNN decoder 714. A projection function is applied to resulting hidden state 726-2 to produce a vector of a same size as the query vocabulary. Soft max function 728 is than applied to the projected vector to normalize the projected vector into vector of probabilities 730-2 over the query vocabulary. The query vocabulary keyword with the highest probability according to the vector of probabilities 730-2 is selected as the next keyword of the target query sequence. In this example, the next keyword selected at the second timestep is "software."

At or before a third timestep after the second timestep, the next keyword selected "software" from the previous second timestep is converted to word vector 724-3 according to an embedding function. For example, word vector 724-3 can be retrieved from a lookup table.

At the third timestep, LSTM RNN decoder 714, with its initial hidden state of hidden state 726-2 after the second timestep, is run over word vector 724-3 resulting in hidden state 726-3 for LSTM RNN decoder 714. A projection function is applied to resulting hidden state 726-3 to produce a vector of a same size as the query vocabulary. Soft max function 728 is than applied to the projected vector to normalize the projected vector into vector of probabilities 730-3 over the query vocabulary. The query vocabulary keyword with the highest probability according to the vector of probabilities 730-3 is selected as the next keyword of the target query sequence. In this example, the next keyword selected at the second timestep is "development."

At or before a fourth timestep after the third timestep, the next keyword selected "development" from the previous third timestep is converted to word vector 724-4 according to an embedding function. For example, word vector 724-4 can be retrieved from a lookup table.

At the fourth timestep, LSTM RNN decoder 714, with its initial hidden state of hidden state 726-3 after the third timestep, is run over word vector 724-4 resulting in hidden state 726-4 for LSTM RNN decoder 714. A projection function is applied to resulting hidden state 726-4 to produce a vector of a same size as the query vocabulary. Soft max function 728 is than applied to the projected vector to normalize the projected vector into vector of probabilities 730-4 over the query vocabulary. The query vocabulary keyword with the highest probability according to the vector of probabilities 740-4 is selected as the next keyword of the target query sequence. In this example, the next keyword selected at the second timestep is the predefined end-of-query <EOQ> symbol. Because the predefined end-of-query <EOQ> symbol is selected, the decoding stops after the fourth timestep and the final target query is determined as "Acme software development." Alternatively, decoding can stop after a threshold number of timesteps even if the predetermined end-of-query <EOQ> has not yet been selected by the decoder.

Training Dataset

According to some embodiments, training the neural related query generator involves handling the conditioning on source queries. For this, a parallel training corpus of source and target query pairs may be used. The query pairs of the training corpus can be generated automatically from query logs, as opposed to having to manually generate training examples.

According to some embodiments, query logs are parsed and analyzed to determine pairs of queries (X, Y) where query Y is considered to be a reformulation of query X. A variety of different approaches may be used to determine whether a query Y is a reformulation of query X and the present invention is not limited to any particular approach. However, according to some embodiments of the present invention, a heuristic approach is used where a query Y in the query logs is considered to be reformulation of query X if all of the following conditions are met, or a subset or a superset thereof:

Both query X and query Y are submitted by the same user/same user search session/same user account,
Query Y is submitted within a threshold amount of time (e.g., one minute) of the submission of query X, and
Query X and query Y have at least one keyword in common.

The above is just one example heuristic to determine whether two queries in a query log should be paired together as one being a reformulation of the other. Other heuristics may be used. For example, click-through logs of the search system may be used to identify queries that should be paired together. A typically querying user behavior where a user reformulates a query to get more relevant search results from the search system involves the user submitting an original query and then clicking on a search result that the user believes satisfies the user's information need. However, upon viewing the web page at the search result link for a very short period of time (e.g., a few seconds), the user may quickly realize that the web page does not satisfy the user's information need. The user may then return to the search query submission form web page and submit a new reformulated query to get better search results. The click-through logs may reveal this query reformulation pattern. In particular, the click-through logs may reveal that the user viewed (i.e., dwelled) on the web page at the link of the search results for the original query for only a few seconds (i.e., a short click) before navigating back to the search query submission form web page. This condition, perhaps combined with one or more of the above-listed conditions, may indicate that the subsequent query was a reformulation of the original query. On the other hand, if the click-through logs reveal that the user viewed/dwelled on the web page at the link for an extended period of time (i.e., a long click), then it may be determined, perhaps based on one or more other conditions, that the original query met the user's information need and that the subsequent query was for a different information need.

The training data of query pairs may be viewed as a parallel corpus. It should be noted that it is quite possible for different query pairs with the same source query but different target queries to exist in the training dataset. For example, the query logs may reflect that some users reformulate the query "software engineer" as "software developer" while other users (or even some of the same users at different times) reformulate the query "software engineer" as "senior software engineer." Query pairs for both reformulations may exist in the training dataset. For example, the training dataset may have a query pair ("software engineer," "software developer") and another query pair ("software engineer," "senior software engineer").

It is also possible for the same query pair to exist multiple times in the training dataset to reflect the relative frequency with which that reformulation occurs in the query logs. Thus, the set of query pairs of the training dataset may reflect not just the set of unique query reformulation occurrences in the query logs but also the relative frequency with which each such query reformulation occurs in the query logs.

The training dataset may be updated on an ongoing basis and the neural related query generator periodically retrained based thereon. For example, the neural related query generator may be initially trained on a set of query pairs extracted from query logs reflecting search activity of the search system over an initial period of time. Then, the neural related query generator may be retrained sometime later after the initial training to incorporate query pairs extracted from more recent query log data. In this way, as time goes on, the neural related query generator may generate related queries based on recent query reformulation patterns by users of the search system.

Although not required, it should be noted that source queries and related queries may undergo a data cleaning operation both before training the neural related query generator. For example, queries in the training dataset may be cleaned by removing non-printable characters, removing punctuation characters, normalizing Unicode characters to ASCII characters, normalizing case to lowercase (or uppercase), and/or removing any characters that are not alphabetic. The same cleaning operation may be performed on a given source query at inference time when using the trained neural related query generator to generate a related query for the given source query.

Training

Figure 8:
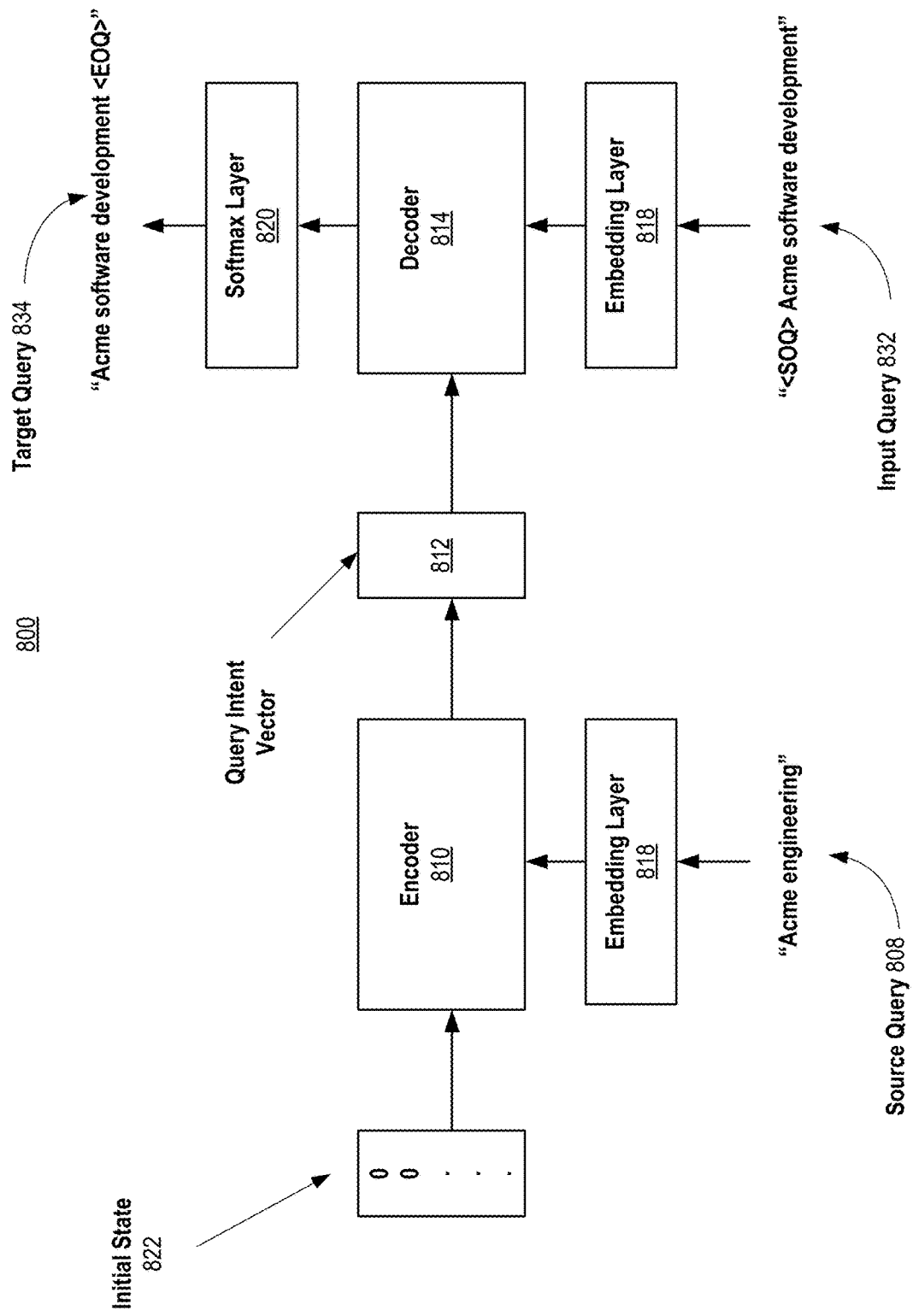
FIG. 8 depicts an example training approach training a neural query intent decoder for neural related query generation, according to some embodiments of the present invention.

FIG. 8 depicts example training approach 800 for training neural query intent decoder 814 for neural related query generation, according to some embodiments of the present invention. Training approach 800 may be performed for each query pair of the training dataset with learned model weights of neural query intent decoder 814 accumulating over the training. Training approach 800 depicts training of neural query intent decoder 814 for a single query pair of the training dataset and approach 800 may be repeat the other query pairs of the training dataset.

According to some embodiments, both neural query encoder 810 and neural query intent decoder 814 are deep multi-layer (e.g., two layer) LSTM RNNs. The hidden state of neural query encoder 810 are initialized to initial state 822. Initial state 822 may include zero vectors for the hidden state of neural query encoder 810.

Source query 808 of the query pair is input to embedding layer 818 to obtain word vectors representing embeddings of the keywords of source query 808. The embeddings may be pretrained word representations such as Word2vec or Glove vectors. Alternatively, the embeddings may be learned from scratch from the training dataset.

The word vectors obtained from embedding layer 818 are input to neural query encoder 810, one at a time, and the LSTM RNN of neural query encoder 810 run over the input word vector at each timestep. The final internal states of neural query encoder 810 after the last word vector is input and run over is taken as query intent vector(s) 812. Query intent vector(s) 812 represent an understanding of source query 80 according to neural query encoder 810.

Next, the internal states of neural query intent decoder 814 are initialized to query intent vector(s) 812. Then, with the internal states initialized as such, neural query intent decoder 814 is trained to generate target query sequence 834 based on input query sequence 832. Input query sequence 832 may be formed by prepending the predetermined start-of-query <SOQ> symbol to the related query of the current training query pair. Target query sequence 834 may be formed by appending the predetermined end-of-query <EOQ> symbol to the related query of the current training query pair.

The forward pass of training may compute a training loss such as the categorical cross-entropy loss and the training objective may be to minimize the training loss. The training loss may be computed in batches over the training dataset such as, for example, by using a mini-batch stochastic gradient descent with optimization (e.g., Adam optimization). The backpropagation pass may include a gradient clipping step such as, for example, by the global norm.

Neural Related Query Generation with Attention

According to some embodiments, an attention mechanism is used to force the neural query intent decoder to learn to focus on specific parts of the source query sequence when decoding the query intent vector and generating the target query sequence. By using the attention mechanism, the neural related query generator can be handling longer queries. The foundations of the attention mechanism are described in the paper by Dzmitry Bandanau, Kyunghyun Cho, and Yoshua Bengio; 2015; Neural machine translation by jointly learning to align and translate. In ICLR, the entire contents of which is hereby incorporated by reference.

Figure 9:
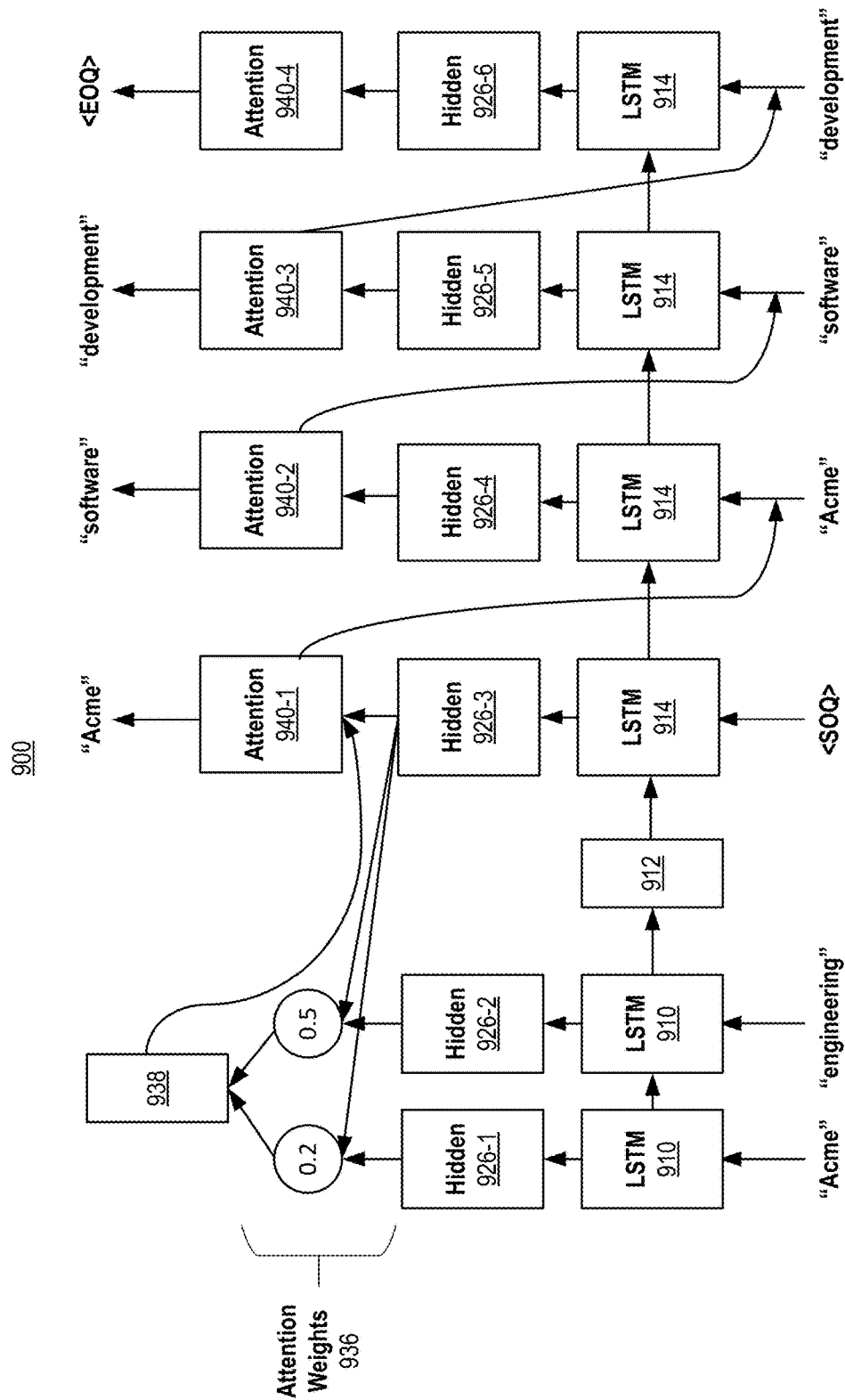
FIG. 9 depicts an example attention mechanism for neural related query generation in an unrolled time view, according to some embodiments of the present invention.

FIG. 9 depicts example attention mechanism 900 for neural related query generation, according to some embodiments of the present invention. The embedding, soft max, and projection layers are omitted from FIG. 9 for the purpose of providing a clear example. An attention computation may occur at each timestep of the neural query intent decoder 914 during training and inference. The attention computation for just the first timestep of decoder 914 is shown in FIG. 9. A similar attention computation may be performed for the second and third timesteps of decoder 914.

The resulting internal/hidden state 926-3 of decoder 914 after the first timestep of decoder 914 is compared to each internal/hidden states 926-1 and 926-2 resulting from the timesteps of encoder 910 to generate attention weights 936. Based on attention weights 936, context vector 938 is generated as a weighted average of internal/hidden states 926-1 and 926-2. Context vector 936 is combined with resulting internal/hidden state 926-3 of the first timestep of decoder 914 to produce attention vector 940-1, which is the input to decoder 914 at the next (second) timestep.

When comparing resulting internal/hidden state 926-3 of decoder 914 after the first timestep of decoder 914 to each internal/hidden states 926-1 and 926-2 resulting from the timesteps of encoder 910 to generate attention weights 936, a scoring function may be used to generate attention weights 936. For example, an additive scoring function such as the known Bandanau's additive style scoring function may be used. A multiplicative style scoring function may also be used. Once attention weights 936 are computed and context vector 938 derived therefrom, attention vector 940-1 may be computed as a function of context vector 938 and resulting internal/hidden state 926-3 of the first timestep of decoder 914. For example, the function for computing attention vector 940-1 may be based on the following equation:

$$\bar{h} = \tan h(W[c;h])$$

Here, $\bar{h}$ represents the attention vector, c represents the current context vector, and h represents the resulting internal/hidden states of the current timestep of the neural query intent decoder.

Training Pipeline

Figure 10:
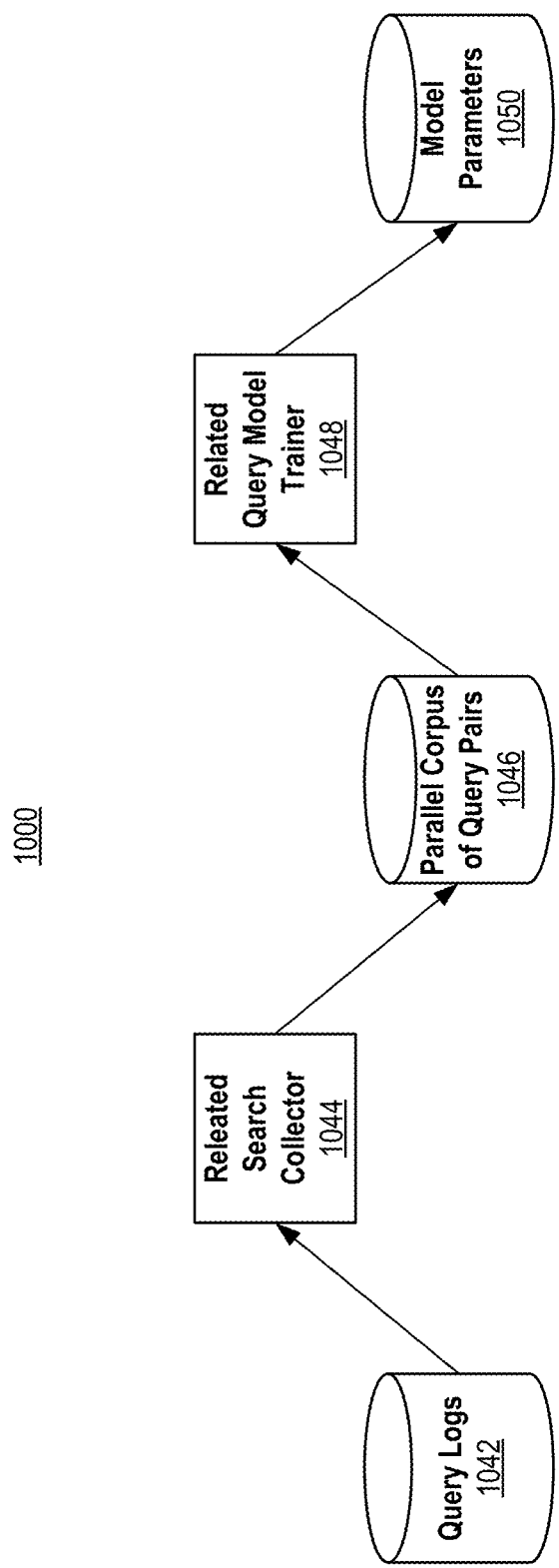
FIG. 10 depicts an example training pipeline for neural related query generation, according to some embodiments of the present invention.

FIG. 10 depicts example training 1000 for neural related query generation, according to some embodiments. Query logs 1042 record actual queries submitted by users to the search system over time. Query logs 1042 may be composed of query log lines where each query log line includes information about a corresponding query submitted to the search system. A query log line for a query may including all of the following information, or a subset or a superset thereof:

The search query string itself (e.g., "Acme engineering") and/or the sequence of keywords of the query string itself (e.g., ['Acme', 'engineering']);

A date and/or time the search query was submitted to, received at, or processed by the search system; and/or Information indicating a user of the search system that submitted the search query such as, for example, a user identifier, a user account identifier, a machine identifier, a network address, a session identifier, etc.

Related search collector 1044, which may be implemented by one or more computer systems (e.g., computer system 1200), automatically parses and analyzes query logs 1042 to form pairs of related queries. The pairs of related queries are included in parallel corpus of query pairs 1046. A pair of related queries may include two queries where one query is determined by a reformulation of the other according to a heuristic or set of heuristics applied by related search collector 1044. No particular heuristic of set of heuristics is required. However, in some embodiments, as mentioned above, a query Y is considered to be reformulation of query X if all of the following conditions are satisfied, or a subset or a superset thereof:

Query X and Query Y have at least one keyword in common,

The date and/or time of Query Y in query logs 1042 is within a threshold amount of time (e.g., one minute) of the date and/or time of Query X in query logs 1042, and Query X and Query Y are both submitted by the same user, or in the context of the same user account or user sessions, or from the same machine or network address.

Once a query pair (Query X, Query Y) is determined by related search collector 1044 to be a reformulation where Query Y is determined to be a reformulation of Query X, then related search collector 1044 may add the query pair to the parallel corpus of query pairs 1046 where Query X is added as the source query of the query pair and Query Y is added as a the target query pair. During training, the neural query intent decoder is trained to predict target Query Y after initializing the hidden state of the decoder based on the query intent vector generated by the neural query encoder for the source Query X.

In some embodiments, related search collector 1044 adds search context-limiting keywords to both the source query and the target query of a query pair identified from query logs 1042 before adding the query pair to parallel corpus of query pairs 1046. The search context-limiting keywords may be added so that more relevant related queries are generated during inference for certain ambiguous source queries.

According to some embodiments, search context limiting keywords are added to both the source and target queries of a query pair for training when both the source and target queries contain a proper name (e.g., a given name of a person, the surname of a person, or the given name and surname of a person). A reason for adding context limiting keywords to queries containing proper names is that proper names can be ambiguous with respect to the particular person the proper name is referring to. For example, a database of index information for search may contain information about multiple people named Daniel Smith. Thus, a query for "Daniel Smith" might be return search results about people the querying user is not interested in. Often, when a query contains a proper name, the querying user is more interested in persons by that name that are commonly situated with the querying user rather than persons that not so commonly situated. For example, if the querying user is located in San Jose, Calif. and is a software engineer by trade, then the querying user, by submitting the query "Daniel Smith," might be more interesting in Daniel Smiths who are also located in San Jose, Calif. and are also software engineers by trade.

According to some embodiments, the context limiting keywords added to a query that are based on known keyword attributes of profile information about the querying user available to the search system. Such keyword attributes may reflect classes of which the querying user is a member. The classes may include, but are not limited to, geographic location (e.g., city, state, country), job title, job level, job industry, education level, former employer, current employer, and/or alma mater. For example, if queries of a query pair determined by related search collector 1044 from query logs 1042 both contain a proper name, then one or more known keyword attributes of the querying user's profile information available to the search system may be added by related search collector 1044 to both the search query and the target query of the query pair before the query pair with the added attributes is included in parallel corpus of query pairs 1046. For example, if the source query is "Daniel Smith" and the target query "Daniel Smith <XXX>", where the <XXX> is some keyword added by the querying user when reformulating the source query as the target query, then related search collector 1044 might add the following query pair to parallel corpus of query pairs 1046: {source query="Daniel Smith San Jose software engineer": target query="Daniel Smith <XXX> San Jose software engineer"} where the keyword phrases "San Jose" and "software engineer" are based on known keyword attributes of the profile information about the querying user. As a result, instead of training the neural related query generator based on the relatively ambiguous query pair {source query="Daniel Smith": target query="Daniel Smith <XXX>"}, the neural related query generator is trained based on a query pair that includes context based on the profile of the querying user. This aids in generating more relevant related queries at inference time for source queries that contain proper names. In particular, at inference time, known keyword attributes of the querying user can be added to the querying user's source query that contains a proper name and the resulting source query with the added attributes can be input to the neural related query generator to generate a related query that may be more relevant to the querying user. For example, the user may be offered the related query "Daniel Smith San Jose software engineer" for the input source query "Daniel Smith".

Once parallel corpus of query pairs 1046 is generated, then related query model trainer 1048, which may be implemented by one or more computer systems (e.g., computer system 1200), may train an encoder-decoder model based on query pairs 1046 (e.g., described above) and store the resulting parameters of trained encoder-decoder model as model parameters 1050.

Inference Pipeline

Once model parameters 1050 are generated and stored and the neural related query encoder-decoder model trained based on query pairs 1046, the trained model may be used to generate related queries for input source queries from users. While in some embodiments the trained model is used to generate related queries for presentation in a user interface at querying users' computing device on a search results web page or the like, the trained model is used to generate related queries for search engine optimization in other embodiments. For example, the trained model can be used to suggest or recommend search engine optimization keywords based on generated related queries given an input source query or set of source keywords.

Figure 11:
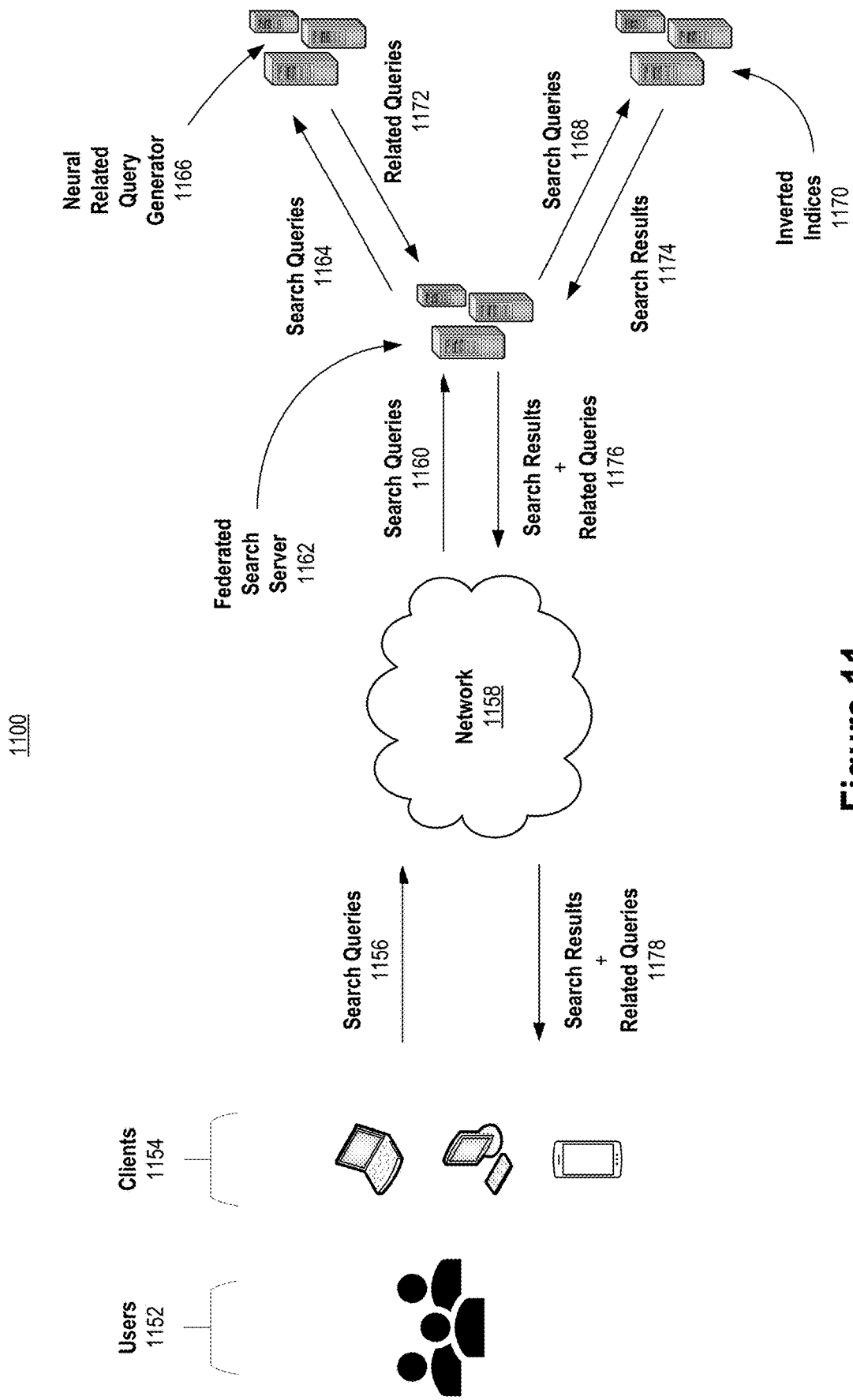
FIG. 11 depicts an example inference pipeline for neural related query generation, according to some embodiments of the present invention.

FIG. 11 depicts example inference pipeline 1100 for neural related query generation, according to some embodiments of the present invention. In general, training pipeline 1000 may operate offline while inference pipeline 1100 may operate online. However, training pipeline 1000 may operate at the same time as inference pipeline 1100. For example, training pipeline 1000 may operate to generate a new or updated encoder-decoder model for neural related query generation while at the same time inference pipeline 1100 operates to generate related queries based on a current trained model that will be replaced with the new or updated encoder-decoder model once training pipeline 100 completes its operation.

In operation, users 1152 use their personal computing device clients 1154 to submit search queries 1156 over data communications network 1158. For example, users 1152 may use a web browser application or a mobile application or a desktop application executing at computing clients 1156 to enter and submit search queries 1156. Search queries 1156 may each include one or more search query keywords where a keyword may be a sequence of one or more printable characters. The submitted search queries 1156 are received as search queries 1160 at federated search server 1162, which may be implemented on one or more computer systems (e.g., computer system 1200). Search queries 1160 may be search queries 1156 or equivalent transformations thereof performed by one or more intermediate devices in network 1158. Data communications network 1158 may support the transmission of internet protocol (IP) data packets.

Based on receiving search queries 1160, federated search server 1162 sends search queries 1164 and 1168 to neural related query generator 1166 and inverted indices 1170. Neural related query generator 1166 may be implemented on one or more computer systems (e.g., computer system 1200) and connected to federated search server 1162 by a data communications network (not shown) over which it receives search queries 1164 and sends related queries 1172. Likewise, inverted indices 1170 may be implemented on one or more computer systems (e.g., computer system 1200) and connected to federated search server 1162 by a data communications network (not shown) over which it receives search queries 1168 and sends search results 1174. Search queries 1164 and 1168 may be search queries 1160 received by federated search server 1162 or may be analagous transformations thereof. For example, a forwarded search query sent from federated search server 1162 to neural related query generator 1166 or inverted indices 1170 corresponding to a received search query received at federated search server 1162 over network 1158 may reflect spelling corrections and/or data cleaning performed on one or more keywords of the received search query.

Pipeline 1100 is configured such that neural related query generator 1166 and inverted indices 1170 can process search queries concurrently in a parallel processing manner. In particular, for a search query received at federated search server 1162, server 1162 can send a corresponding search query to both neural related query generator 1166 and inverted indices 1170 at the same or substantially the same time such that, for the same query received at federated search server 1162, (1) neural related query generator 1166 can generate related queries for the search query, and (2) inverted indices 1170 can generate search results for the search query, concurrently in a parallel processing manner. As such, if inverted indices 1170 takes longer to generate search results for the search query than the time it takes neural related query generator 1116 to generate related queries for the search query, then generating the related queries for the search query does not add to the overall latency of query processing.

Related queries 1172 returned by neural related query generator 1166 and search results 1174 returned by inverted indices 1170 can be combined into search results and related queries 1176 by federated search server 1162. For example, a set of results for a query provided by inverted indices 1170 and a set of related queries provided by neural related query generator 116 can be combined into a web page or the like or other content item. Search server 1162 sends the combined search results and related queries 1176 over network 1158 toward clients 1154. Corresponding search results and related queries 1178 are received at clients 1154 for presented in user interfaces there to users 1152. Search results and related queries 1178 received by client 1154 may be search results and related queries 1176 sent by federated search server 1162, or equivalent transformations thereof performed by one or more intermediate devices in network 1158.

Neural related query generator 1166 may include a trained neural related query encoder-decoder model for generating related queries 1172 based on search queries 1164. For example, the trained neural related query encoder-decoder may be initialized and configured based on model parameters 1150 generated and stored by training pipeline 1000. When generating a set of N-number of related queries for a given search query, the most relevant N-number of related queries for the given search query are obtained by a beam-search method. Here, N may be selected based on the requirements of the implementation at hand including, but not limited to, a predetermined maximum number of related queries to offer a user in a user interface. N may also vary from source search query to source search query depending on various factors including, but not limited to, whether neural related query generator 1166 can generate the predetermined maximum number of related queries for a given source query. Neural related query generator 1166 may not be able to generate the predetermined maximum number of related queries for a given source query depending on the size of the selected query vocabulary and the beam width selected for the beam-search method.

According to some embodiments, a left-to-right beam search is used in the neural query intent decoder to generate a set of related queries for a given source query. Recall from the discussion above that the neural query intent decoder can output a probability distribution over a selected query vocabulary. To implement the beam search, the neural query intent decoder may maintain a small number of B of partial related queries. Here, B refers to the beam width of the beam search and may be selected according to the requirements of the particular implementation at hand including based on the predetermined maximum number of related queries to offer a user in a user interface. The partial related queries are prefixes of related query candidates. At each timestep of the neural query intent decoder, each partial related query is extended in the beam with every possible word in the selected query vocabulary. For each partial query, the top B most relevant extensions that maximize the probabilities of the partial related queries generated so far are greedily retained and the rest of the extensions discarded. When an end-of-query <EOQ> symbol is generated by neural query intent decoder for a partial related query, the partial related query is considered complete and removed from the beam search and added to the set of related queries for the given source query. Alternatively, a partial related query may be considered complete and removed from the beam search and added to the set of related queries if the partial related query contains a threshold number of generated keywords, even though the end-of-query <EOQ> symbol has not yet been generated for the partial related query. The set of related queries may be ranked for presentation order in a graphical user interface based on the total cumulative probability of the keywords in each query.

Figure 12:
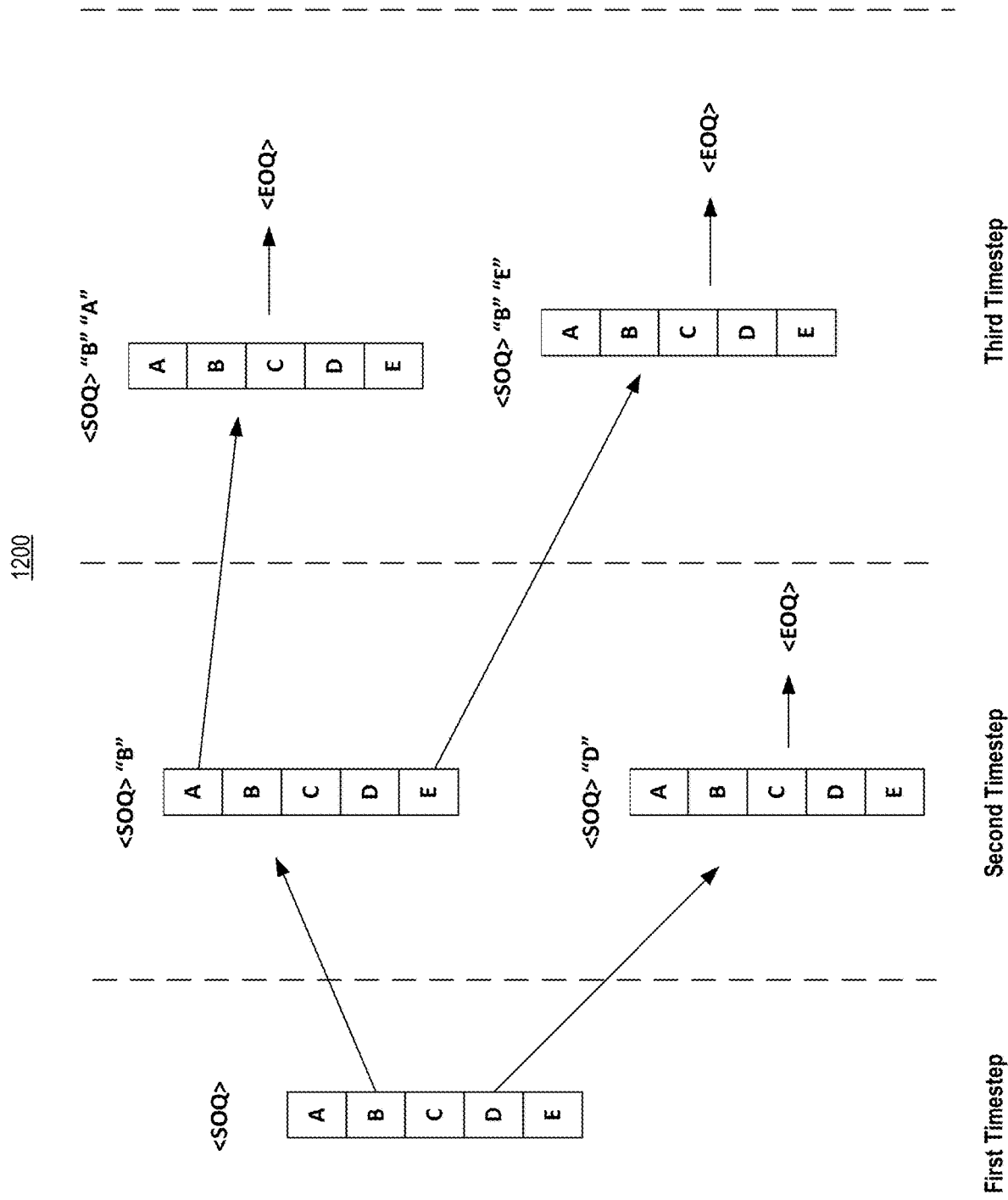
FIG. 12 depicts an example beam-search method for neural related query generation, according to some embodiments of the present invention.

FIG. 12 depicts example beam-search 1200 for neural related query generation, according to some embodiments. Example beam-search 1200 is a simplified version of a practical implementation for the purpose of illustration. In example beam-search 1200, the beam width is just two (2). However, in a more practical embodiment, the beam width may be greater than (2). For example, in a more practical embodiment, the beam width may be five, six, ten, or more. Also, in example beam-search 1200, the size of the query vocabulary is only five words. However, in a more practical embodiment, the number of keywords in the query vocabulary may be much greater.

At the first timestep of the neural query intent decoder, the predetermined start-of-query <SOQ> is input and a resulting probability vector is obtained. The probability vector represents a probability distribution over the query vocabulary. Based on the beam width being two, the top two most probable keywords are selected resulting in two partial related queries: (1) "B" and (2) "D".

At the next timestep of the neural query intent decoder, next keywords are generated for each of the current partial related queries. In particular, keyword "B" is input to the neural query intent decoder at the second timestep and a first resulting probability vector is obtained. Keyword "D" is also input to the neural query intent decoder at the second timestep and a second resulting probability vector is obtained. Note that this operation can be executed in parallel with keyword "B" being input to the neural query intent decoder on one processor and keyword "D" being input to the neural query intent decoder on another processor. These executions are also independent of one another. That is, the first and second probability vectors are calculated independently of one another where both executions start from a same state of the neural query intent decoder after the first timestep.

As a result of the beam search after the second timestep, there are two partial related queries and one complete related query. The two partial related queries are: (1) "B A" and (2) "B E". The complete related query is "D". The complete related query may be added to the set of related queries for given search query. Thereafter, the complete related query is no longer considered in the beam search. The partial related query "B" may be extended with keywords "A" and "E" based on the beam width and those two keywords, among all keywords in the query vocabulary, having the highest probability according to the probability vector generated at the second timestep for the input keyword "B".

At the next timestep of the neural query intent decoder, next keywords are generated for each of the current partial related queries. In particular, keyword "A" is input to the neural query intent decoder at the third timestep and a resulting probability vector is obtained. Keyword "E" is also input to the neural query intent decoder at the third timestep and a resulting probability vector is obtained. Note that this operation can be executed in parallel, with keyword "A" being input to the neural query intent decoder on one processor and keyword "E" being input to the neural query intent decoder on another processor. These executions are also independent of one another. That is, the probability vectors are calculated independently of one another where both executions start from a same state of the neural query intent decoder after the second timestep. As a result of the beam search after the third timestep, there are no partial related queries and two additional complete related queries: (1) "B A" and (2) "B E". The complete related queries may be added to the set of related queries for given search query resulting a final set of related queries of: (1) "D", (2) "B A", and (3) "B E".

Example Computer System

Some implementations encompass performance of a method by a computing system having one or more processors and storage media. The one or more processors and the storage media may be provided by one or more computer systems. The storage media of the computing system may store one or more computer programs that include instructions configured to perform the method and that are executed by the one or more processors to perform the method.

For an implementation that encompasses multiple computer systems, the computer systems may be arranged in a distributed, parallel, clustered or other suitable multi-node computing configuration in which computer systems are continuously, periodically, or intermittently interconnected by one or more data communications networks (e.g., one or more internet protocol (IP) networks.) Further, it need not be the case that the set of computer systems that execute the instructions be the same set of computer systems that provide the storage media storing the one or more computer programs, and the sets may only partially overlap or may be mutually exclusive.

Figure 13:
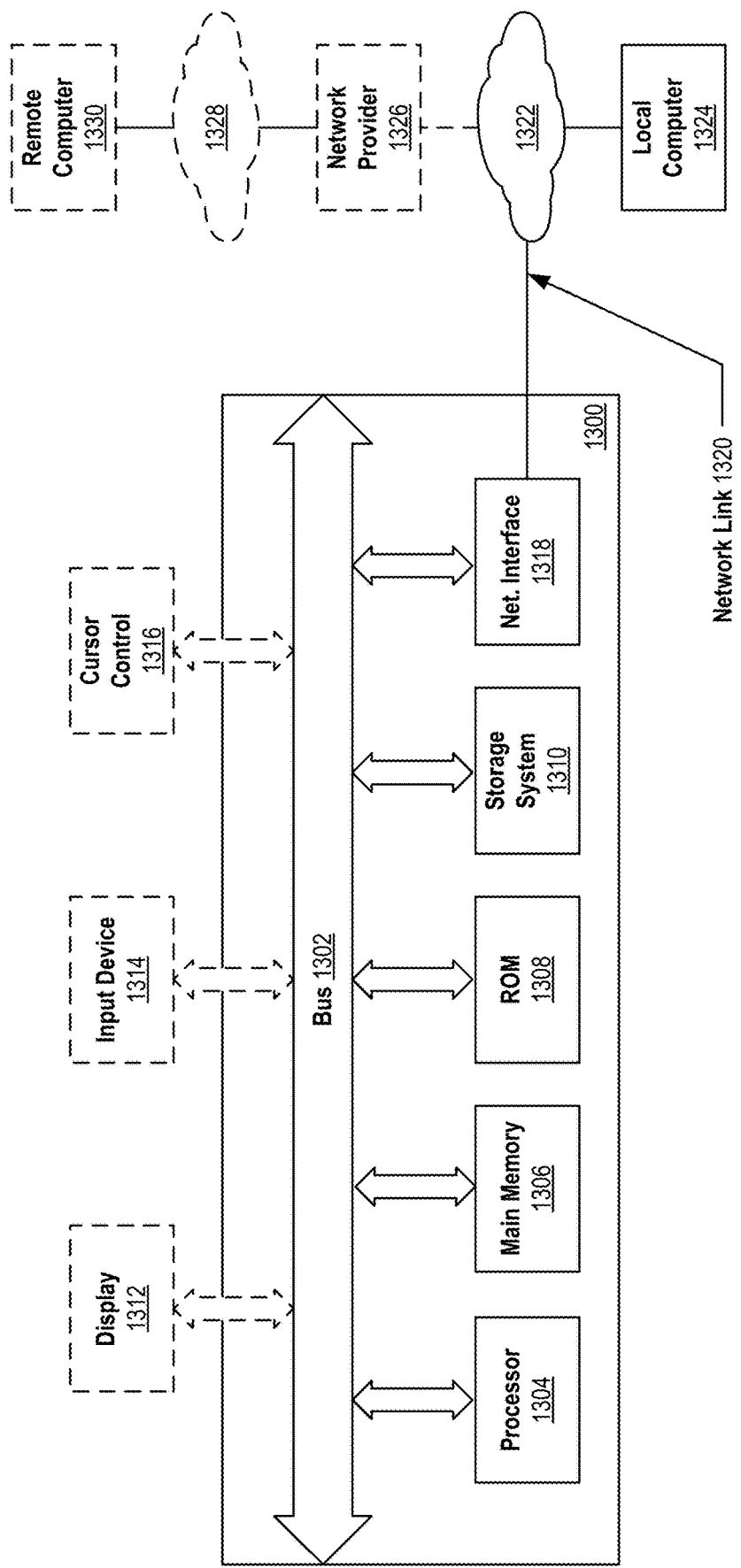
FIG. 13 depicts an example computer system for neural related query generation, according to some embodiments of the present invention.

FIG. 13 is a block diagram of an example computer system 1300 in accordance with some implementations. Computer system 1300 includes bus 1302 or other communication mechanism for communicating information, and one or more hardware processors coupled with bus 1302 for processing information. Hardware processor 1304 may be, for example, a general-purpose microprocessor, a central processing unit (CPU) or a core thereof, a graphics processing unit (GPU), or a system on a chip (SoC).

Computer system 1300 also includes a main memory 1306, typically implemented by one or more volatile memory devices, coupled to bus 1302 for storing information and instructions to be executed by processor 1304. Main memory 1306 also may be used for storing temporary variables or other intermediate information during execution of instructions by processor 1304. Computer system 1300 may also include read-only memory (ROM) 1308 or other static storage device coupled to bus 1302 for storing static information and instructions for processor 1304. A storage system 1310, typically implemented by one or more non-volatile memory devices, is provided and coupled to bus 1302 for storing information and instructions.

Computer system 1300 may be coupled via bus 1302 to display 1312, such as a liquid crystal display (LCD), a light emitting diode (LED) display, or a cathode ray tube (CRT), for displaying information to a computer user. Display 1312 may be combined with a touch sensitive surface to form a touch screen display. The touch sensitive surface is an input device for communicating information including direction information and command selections to processor 1304 and for controlling cursor movement on display 1312 via touch input directed to the touch sensitive surface such by tactile or haptic contact with the touch sensitive surface by a user's finger, fingers, or hand or by a hand-held stylus or pen. The touch sensitive surface may be implemented using a variety of different touch detection and location technologies including, for example, resistive, capacitive, surface acoustical wave (SAW) or infrared technology.

Input device 1314, including alphanumeric and other keys, may be coupled to bus 1302 for communicating information and command selections to processor 1304.

Another type of user input device may be cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Instructions, when stored in non-transitory storage media accessible to processor 1304, such as, for example, main memory 1306 or storage system 1310, render computer system 100 into a special-purpose machine that is customized to perform the operations specified in the instructions. Alternatively, customized hard-wired logic, one or more ASICs or FPGAs, firmware and/or hardware logic which in combination with the computer system causes or programs computer system 1300 to be a special-purpose machine.

A computer-implemented process may be performed by computer system 1300 in response to processor 1304 executing one or more sequences of one or more instructions contained in main memory 1306. Such instructions may be read into main memory 106 from another storage medium, such as storage system 1310. Execution of the sequences of instructions contained in main memory 1306 causes processor 1304 to perform the process. Alternatively, hard-wired circuitry may be used in place of or in combination with software instructions to perform the process.

The term "storage media" as used herein refers to any non-transitory media that store data and/or instructions that cause a machine to operate in a specific fashion. Such storage media may comprise non-volatile media (e.g., storage system 1310) and/or volatile media (e.g., main memory 1306). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 1302. Transmission media can also take the form of acoustic or light waves, such as those generated during radio-wave and infra-red data communications.

Computer system 1300 also includes a network interface 1318 coupled to bus 1302. Network interface 1318 provides a two-way data communication coupling to a wired or wireless network link 1320 that is connected to a local, cellular or mobile network 1322. For example, communication interface 1318 may be IEEE 802.3 wired "ethernet" card, an IEEE 802.11 wireless local area network (WLAN) card, an IEEE 802.15 wireless personal area network (e.g., Bluetooth) card or a cellular network (e.g., GSM, LTE, etc.) card to provide a data communication connection to a compatible wired or wireless network. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through network 1322 to local computer system 1324 that is also connected to network 1322 or to data communication equipment operated by a network access provider 1326 such as, for example, an internet service provider or a cellular network provider. Network access provider 1326 in turn provides data communication connectivity to another data communications network 1328 (e.g., the internet). Networks 1322 and 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the networks 1322 and 1328, network link 1320 and communication interface 1318. In the internet example, a remote computer system 1330 might transmit a requested code for an application program through network 1328, network 1322 and communication interface 1318. The received code may be executed by processor 1304 as it is received, and/or stored in storage device 1310, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A method for neural related search performed by a computing system having one or more processors and storage media storing one or more programs, the one or more programs including instructions configured to perform the method and executed by the one or more processors to perform the method, the method comprising:
   training a deep recurrent neural network based on a parallel corpus of keyword query pairs, each keyword query pair of the parallel corpus of keyword query pairs comprising a source keyword query and a related keyword query;
   wherein the deep recurrent neural network comprises an encoder deep recurrent neural network and a decoder deep recurrent neural network;
   wherein the training the deep recurrent neural network based on the parallel corpus of keyword query pairs comprises:
      training the encoder deep recurrent neural network to generate query intent vectors from the source keyword queries of the parallel corpus of keyword query pairs,
      initializing the decoder deep recurrent neural network with the query intent vectors,
      forming input query sequences and target query sequences based on the related queries of the parallel corpus of keyword query pairs, and
      training the decoder deep recurrent neural network to generate the target query sequences from the input query sequences;
   based on the training the deep recurrent neural network based on the parallel corpus of keyword query pairs, inferring one or more particular related queries for a particular source query, the particular source query comprising one or more keywords, each particular related query of the one or more particular related queries comprising one or more keywords; and
   causing the one or more particular related queries to be presented in a user interface at a client computing device.

2. The method of claim 1, further comprising:
   determining the parallel corpus of keyword query pairs based on one or more query logs; and
   wherein at least one keyword query pair, of the parallel corpus of keyword query pairs, includes a keyword query determined to be a reformulation occurrence of another keyword query.

3. The method of claim 1, further comprising:
   determining, based on an inverted index, one or more search results for the particular source query
   at least partially at a same time as performing the inferring the one or more particular related queries for the particular source query.

4. The method of claim 1, wherein the deep recurrent neural network comprises two long short-term memory layers.

5. The method of claim 1, further comprising:
determining one or more context limiting keywords from user profile information about a querying user; and
including the one or more context limiting keywords in both the source query and the related keyword query of a keyword query pair of the parallel corpus of keyword query pairs.

6. The method of claim 1, wherein the training the deep recurrent neural network based on the parallel corpus of keyword query pairs comprises using an attention mechanism to force the decoder deep recurrent neural network to learn to focus on specific parts of the input query sequences when decoding the query intent vectors to generate the target query sequences.

7. The method of claim 1, wherein the training the deep recurrent neural network based on the parallel corpus of keyword query pairs comprises obtaining word embedding vectors for keywords of source keyword queries of keyword query pairs of the parallel corpus of keyword query pairs; and wherein the training the encoder deep recurrent neural network to generate query intent vectors from source keyword queries of the parallel corpus of keyword query pairs comprises training the encoder deep recurrent neural network to generate query intent vectors from the word embedding vectors.

8. One or more non-transitory computer-readable media comprising one or more programs, the one or more programs including instructions for execution by a computing system having one or more processors, the instructions configured for:
determining a parallel corpus of keyword query pairs based on one or more query logs, each keyword query pair of the parallel corpus of keyword query pairs comprising a source keyword query and a related keyword query;
training a deep recurrent neural network based on the parallel corpus of keyword query pairs;
wherein the deep recurrent neural network comprises an encoder deep recurrent neural network and a decoder deep recurrent neural network;
wherein the instructions configured for the training the deep recurrent neural network based on the parallel corpus of keyword query pairs comprise instructions configured for:
training the encoder deep recurrent neural network to generate query intent vectors from the source keyword queries of the parallel corpus of keyword query pairs,
initializing the decoder deep recurrent neural network with the query intent vectors,
forming input query sequences and target query sequences based on the related keyword queries of the parallel corpus of keyword query pairs, and
training the decoder deep recurrent neural network to generate the target query sequences from the input query sequences;
based on the training the deep recurrent neural network based on the parallel corpus of keyword query pairs, inferring one or more particular related queries for a particular source query, the particular source query comprising one or more keywords, each related query of the one or more particular related queries comprising one or more keywords; and
causing the one or more particular related queries to be presented in a user interface at a client computing device.

9. The one or more non-transitory computer-readable media of claim 8, the instructions for determining the parallel corpus of keyword query pairs based on the one or more query logs further comprising instructions configured for:
determining that an occurrence of a first keyword query in the one or more query logs is a reformulation of an occurrence of a second keyword query in the one or more query logs, based on determining all of the following:
the occurrence of the first keyword query is within a threshold amount of time of the occurrence of the second keyword query;
the occurrence of the first keyword query has at least one keyword in common with the occurrence of the second keyword query includes; and
the occurrence of the first keyword query and the occurrence of the second keyword query is associated with a same user.

10. The one or more non-transitory computer-readable media of claim 8, the one or more programs further including instructions configured for:
determining, based on an inverted index, one or more search results for the particular source query
at least partially at a same time as the inferring the one or more particular related queries for the particular source query is performed.

11. The one or more non-transitory computer-readable media of claim 8, wherein the deep recurrent neural network comprises two long short-term memory layers.

12. The one or more non-transitory computer-readable media of claim 8, one or more programs further including instructions configured for:
determining one or more context limiting keywords from user profile information about a querying user; and
including the one or more context limiting keywords in both the source keyword query and the related keyword query of a keyword query pair of the parallel corpus of keyword query pairs.

13. The one or more non-transitory computer-readable media of claim 8, wherein the instructions configured for training the deep recurrent neural network based on the parallel corpus of keyword query pairs comprise instructions configured for using an attention mechanism to force the decoder deep recurrent neural network to learn to focus on specific parts of the input query sequences when decoding the query intent vectors to generate the target query sequences.

14. The one or more non-transitory computer-readable media of claim 8, wherein the instructions configured for training the deep recurrent neural network based on the parallel corpus of keyword query pairs comprise instructions configured for obtaining word embedding vectors for keywords of source keyword queries of keyword query pairs of the parallel corpus of keyword query pairs; and wherein the training the encoder deep recurrent neural network to generate query intent vectors from source keyword queries of the parallel corpus of keyword query pairs comprises training the encoder deep recurrent neural network to generate query intent vectors from the word embedding vectors.

15. A computing system comprising:
one or more processors;
storage media;
one or more programs stored in the storage media and configured for execution by the one or more processors, the one or more programs including instructions configured for:

training a deep recurrent neural network based on a parallel corpus of keyword query pairs, each keyword query pair of the parallel corpus of keyword query pairs comprising a source keyword query and a related keyword query;

wherein the deep recurrent neural network comprises an encoder deep recurrent neural network and a decoder deep recurrent neural network;

wherein the instructions configured for the training the deep recurrent neural network based on the parallel corpus of keyword query pairs comprise instructions configured for:

training the encoder deep recurrent neural network to generate query intent vectors from the source keyword queries of the parallel corpus of keyword query pairs, initializing the decoder deep recurrent neural network with the query intent vectors, forming input query sequences and target query sequences based on the related keyword queries of the parallel corpus of keyword query pairs, and training the decoder deep recurrent neural network to generate the target query sequences from the input query sequences;

based on the training the deep recurrent neural network based on the parallel corpus of keyword query pairs, inferring one or more particular related queries for a particular source query, the particular source query comprising one or more keywords, each related query of the one or more particular related queries comprising one or more keywords;

determining one or more search results for the particular source query at least partially at a same time as the inferring the one or more particular related queries for the particular source query; and causing the one or more search results and the one or more particular related queries to be presented in a user interface at a client computing device.

16. The computing system of claim 15, the one or more programs further including instructions configured for:
    determining the parallel corpus of keyword query pairs based on one or more query logs; and
    wherein at least one keyword query pair, of the parallel corpus of keyword query pairs, includes a keyword query determined to be a reformulation occurrence of another keyword query.

17. The computing system of claim 15, wherein the deep recurrent neural network comprises two long short-term memory layers.

18. The computing system of claim 15, one or more programs further including instructions configured for:
    determining one or more context limiting keywords from user profile information about a querying user; and
    including the one or more context limiting keywords in both the source keyword query and the related keyword query of a keyword query pair of the parallel corpus of keyword query pairs.

19. The computing system of claim 15, wherein the instructions configured for training the deep recurrent neural network based on the parallel corpus of keyword query pairs comprise instructions configured for using an attention mechanism to force the decoder deep recurrent neural network to learn to focus on specific parts of the input query sequences when decoding the query intent vectors to generate the target query sequences.

20. The computing system of claim 15, wherein the instructions configured for training the deep recurrent neural network based on the parallel corpus of keyword query pairs comprise instructions configured for obtaining word embedding vectors for keywords of source keyword queries of keyword query pairs of the parallel corpus of keyword query pairs; and wherein the training the encoder deep recurrent neural network to generate query intent vectors from keyword source queries of the parallel corpus of keyword query pairs comprises training the encoder deep recurrent neural network to generate query intent vectors from the word embedding vectors.

* * * * *